(12) United States Patent
Takemura et al.

(10) Patent No.: US 11,758,058 B2
(45) Date of Patent: Sep. 12, 2023

(54) IMAGE FORMING APPARATUS CONTROLLING TIMING OF FORMING MEASUREMENT IMAGE BASED ON PRIOR MEASUREMENTS AND DENSITY OF IMAGE TO BE FORMED

(71) Applicant: CANON KABUSHIKI KAISHA, Tokyo (JP)

(72) Inventors: Taichi Takemura, Chiba (JP); Akihito Yokote, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/948,915

(22) Filed: Sep. 20, 2022

(65) Prior Publication Data
US 2023/0090095 A1    Mar. 23, 2023

(30) Foreign Application Priority Data
Sep. 21, 2021    (JP) ................. 2021-153618

(51) Int. Cl.
*H04N 1/00* (2006.01)
*H04N 1/60* (2006.01)
*H04N 1/407* (2006.01)

(52) U.S. Cl.
CPC ..... *H04N 1/00005* (2013.01); *H04N 1/00015* (2013.01); *H04N 1/00034* (2013.01); *H04N 1/00045* (2013.01); *H04N 1/00055* (2013.01); *H04N 1/00068* (2013.01); *H04N 1/00087* (2013.01); *H04N 1/4072* (2013.01); *H04N 1/4078* (2013.01); *H04N 1/6027* (2013.01); *H04N 1/6044* (2013.01); *H04N 1/6063* (2013.01)

(58) Field of Classification Search
None
See application file for complete search history.

(56) References Cited

U.S. PATENT DOCUMENTS

| 5,220,373 A | 6/1993 | Kanaya |
| 6,418,281 B1 | 7/2002 | Ohki |

(Continued)

FOREIGN PATENT DOCUMENTS

| JP | 05-72859 A | 3/1993 |
| JP | 2000-238341 A | 9/2000 |

(Continued)

*Primary Examiner* — Scott A Rogers
(74) *Attorney, Agent, or Firm* — Venable LLP

(57) ABSTRACT

An image forming apparatus comprises an image forming unit; a sensor that measures a measurement image; and a controller. The controller controls the image forming condition based on a measurement result of measuring a first measurement image; acquires information having a correlation to density variation of images to be formed by the image forming unit; controls the image forming condition based on the information; determines a first value regarding a density of an image to be formed, based on a measurement result of measuring a second measurement image; determines a second value regarding a density of the image to be formed by the image forming unit, based on the information; and controls a timing at which the image forming unit next forms the first measurement image, based on the first value and the second value.

16 Claims, 20 Drawing Sheets

(56) References Cited

U.S. PATENT DOCUMENTS

| | | | | |
|---|---|---|---|---|
| 7,072,597 | B2* | 7/2006 | Shimura | G03G 15/5058 |
| | | | | 399/49 |
| 8,194,299 | B2* | 6/2012 | Yamashita | H04N 1/40006 |
| | | | | 358/1.9 |
| 8,547,596 | B2* | 10/2013 | Tonami | H04N 1/6033 |
| | | | | 358/1.9 |
| 9,310,742 | B2* | 4/2016 | Shirafuji | G03G 15/5062 |
| 9,897,956 | B2 | 2/2018 | Takemura | |
| 11,232,332 | B2 | 1/2022 | Yokote | |
| 11,378,908 | B2* | 7/2022 | Haga | G03G 21/0094 |
| 11,442,388 | B2 | 9/2022 | Yokote | |
| 11,516,369 | B2* | 11/2022 | Shiga | H04N 1/4078 |
| 2021/0041822 | A1 | 2/2021 | Yokote | |
| 2023/0013372 | A1* | 1/2023 | Yokote | G03G 15/5045 |
| 2023/0098328 | A1* | 3/2023 | Yokote | H04N 1/00031 |
| | | | | 358/1.14 |
| 2023/0098673 | A1* | 3/2023 | Shiga | H04N 1/52 |
| | | | | 358/3.13 |

FOREIGN PATENT DOCUMENTS

| | | | |
|---|---|---|---|
| JP | 2003-167394 A | | 6/2003 |
| JP | 2017-037100 A | | 2/2017 |
| JP | 2023-38807 A | * | 3/2023 |
| JP | 2023-48849 A | * | 4/2023 |

* cited by examiner

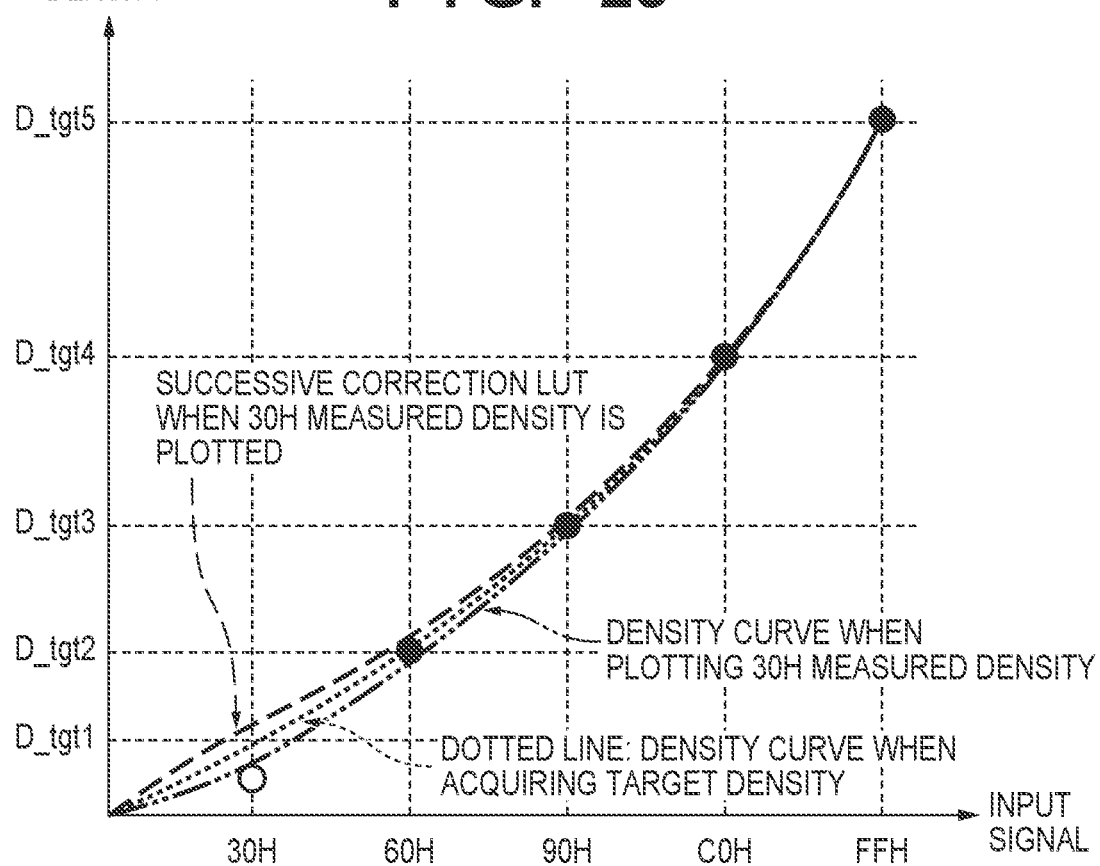

IMAGE FORMING APPARATUS CONTROLLING TIMING OF FORMING MEASUREMENT IMAGE BASED ON PRIOR MEASUREMENTS AND DENSITY OF IMAGE TO BE FORMED

BACKGROUND OF THE INVENTION

Field of the Invention

The present invention relates to an image forming apparatus, and, for example, to an image forming apparatus using an electrophotographic process.

Description of the Related Art

In an image forming apparatus, the density and density gradation characteristics of an output image may differ from desired density and gradation characteristics due to short-term variation caused by variation in the environment in which the apparatus is installed and variation in the environment within the apparatus, long-term variation caused by temporal change (temporal deterioration) in a photosensitive member or a developing agent, or the like. Therefore, in the image forming apparatus, in order to adjust the density and gradation characteristics of the output image to desired density and gradation characteristics, it is necessary to correct the image forming conditions as needed in consideration of these various variations.

The process of appropriately correcting the change in density or color tone in this manner is generally referred to as calibration. In the calibration, for example, some pattern images having a uniform density are formed on a sheet, a photosensitive member, an intermediate transfer member, or the like; the density of the formed pattern is measured and compared with a target value; and various conditions for forming an image are appropriately adjusted based on the comparison result.

Conventionally, in order to stabilize the density and gradation characteristics of the output image mentioned above, a specific correction pattern such as a gradation pattern is formed on a sheet as in U.S. Pat. No. 6,418,281. The stability of image quality is improved by reading a formed pattern with an image reading unit and feeding back the read gradation pattern information into an image forming condition such as γ (gamma) correction.

In addition, regarding when calibration is required, it is necessary to correct the gradation characteristics as appropriate in various situations, including cases of environment variation as described above or where the apparatus is left standing for a long time. For example, it is necessary to correct the gradation characteristics when environmental variation is particularly liable to occur such as when the power is turned on or when the apparatus returns from a power saving mode first thing in the morning, and in a case where the toner replenishment amount is large due to an output image duty being high, or conversely, when jobs having a low output image duty have been performed continuously. As a technique for performing such calibration, for example, a method such as that disclosed in Japanese Patent Laid-Open No. 2003-167394 has been proposed. Japanese Patent Laid-Open No. 2003-167394 uses a method in which a density patch image of each color is formed on an intermediate transfer member or a transfer belt, the density patch images are read by a density detection sensor, and detection results are fed back into the conditions for charging the intermediate transfer member and image processing conditions to thereby adjust the halftone gradation characteristics and the maximum density of each color.

In recent years, there has been an increasing demand for improving, together with stability of image quality, usability, and especially productivity by reducing standby time and downtime, and there is a strong demand for being able to perform calibration control for image quality stabilization over a shorter time. As a technique to handle such demand, models have been created in which variations in external environment, image output conditions, and various sensor values are used as input values, and variations in patches for calibration are predicted from the model, as in Japanese Patent Laid-Open No. 2017-37100, for example. In this way, there have been proposed techniques for omitting the process of forming an image of the patches, which consumes much of the time in calibration.

Furthermore, as a method of performing control such that an optimum operation value is obtained depending on a usage environment and a usage situation in a model for predicting variation, a technique such as that disclosed in Japanese Patent Laid-Open No. H5-72859 has been proposed. Japanese Patent Laid-Open No. H5-72859 proposes a technique of learning the characteristics of an image forming apparatus using a neural network and determining an operation amount from a state prediction value and a target value.

However, in the calibration method for predicting the variation of the color tone and the density by the model as described above, the following problem occurs. It is common to use an average model that can cover certain usage environments and situations as a density prediction model, which is not always optimal for an individual usage environment.

SUMMARY OF THE INVENTION

According to one aspect of the present invention, an image forming apparatus includes an image forming unit configured to form an image on a sheet based on an image forming condition; a sensor configured to measure a measurement image formed by the image forming unit; and a controller configured to control the image forming condition based on a measurement result of measuring a first measurement image by the sensor; acquire information having a correlation to density variation of images to be formed by the image forming unit; control the image forming condition based on the information; determine a first value regarding a density of an image to be formed by the image forming unit, based on a measurement result of measuring a second measurement image by the sensor; determine a second value regarding a density of the image to be formed by the image forming unit, based on the information; and control a timing at which the image forming unit next forms the first measurement image, based on the first value and the second value.

Further features of the present invention will become apparent from the following description of exemplary embodiments with reference to the attached drawings.

BRIEF DESCRIPTION OF THE DRAWINGS

FIG. 23 is a view illustrating a relationship of each LUT at a time of actual measurement control in the embodiment.

DESCRIPTION OF THE EMBODIMENTS

Figure 1:
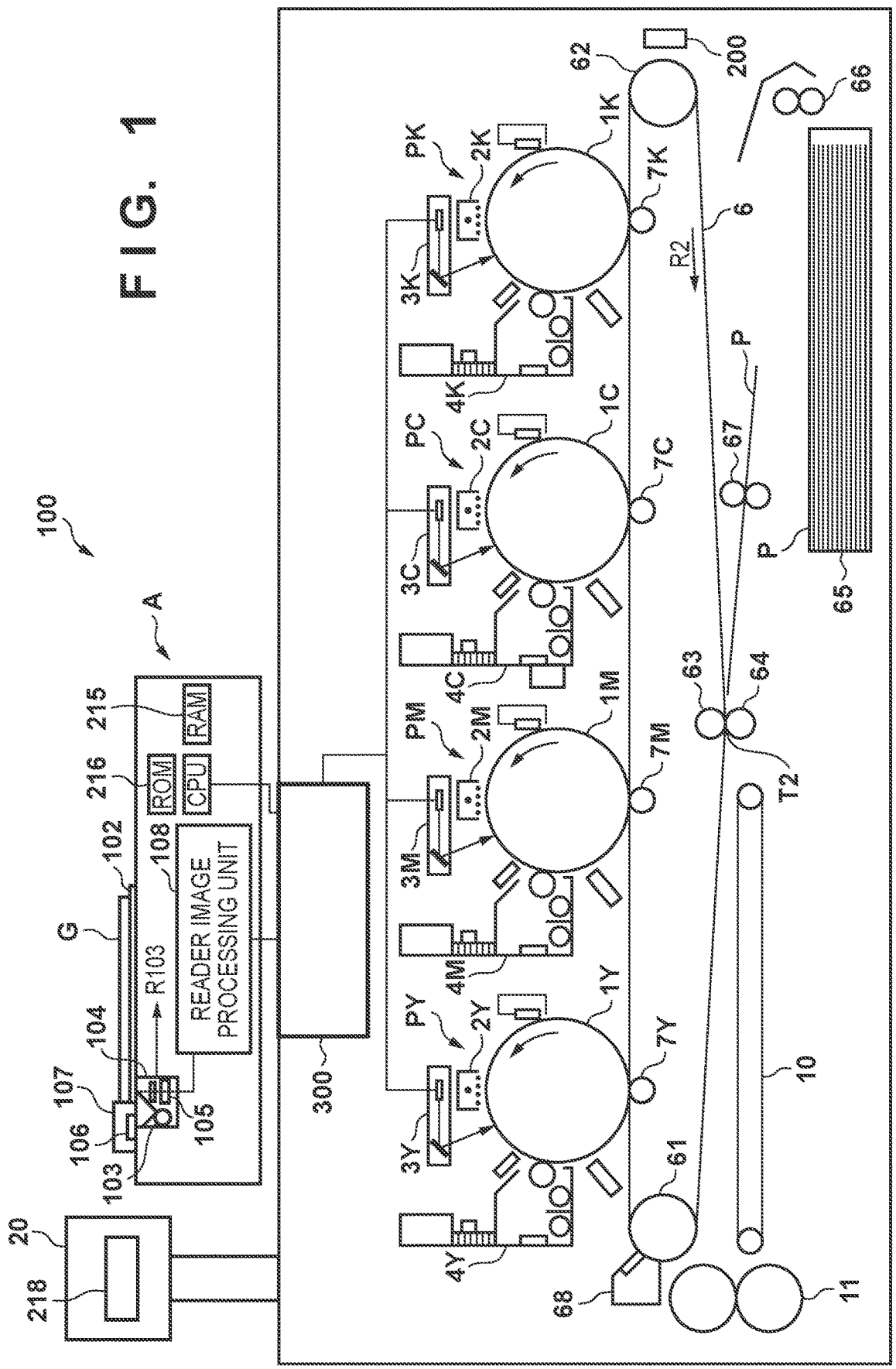
FIG. 1 is an overall schematic configuration diagram of an image forming apparatus in an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Embodiment 1

First, a first embodiment of the present invention will be described. In the present embodiment, a method for solving the above-mentioned problem using an electrophotographic (or electrophotographic process) image forming apparatus will be described. An electrophotographic method will be described, but the characteristics of the control are the same even for inkjet printers, dye sublimation printers, or the like; the problem can be solved by using the configuration and method described hereinafter. Therefore, the invention according to the above mentioned claims encompasses various kinds of image forming apparatuses.

Image Forming Apparatus

Reader Unit

As shown in FIG. 1, an image forming apparatus 100 includes a reader unit A. An original placed on an original platen glass 102 of the reader unit A is illuminated by a light source 103, and light reflected from the original passes through an optical system 104 and is imaged in a charge-coupled device (CCD) sensor 105. The CCD sensor 105 consists of CCD line sensors arranged in three rows for red, green, and blue, and generates red, green, and blue color component signals for the respective line sensors. These reading optical system units are moved in the direction of an arrow R103 shown in FIG. 1, and convert an image of the original into an electric signal for each line. A positioning member 107 for abutting one side of the original to prevent the original from being arranged diagonally and a reference white plate 106 for determining a white level of the CCD sensor 105 to perform shading correction of an image captured by the CCD sensor 105 are arranged on the original platen glass 102. An image signal obtained by the CCD sensor 105 is subjected to A/D conversion by a reader image processing unit 108, shading correction using a read signal of the reference white plate 106, and color conversion, and then is sent to a printer unit, and is processed by a printer control unit. The reader unit A is connected to an operation unit 20 for an operator to perform operations such as an operation to start a copy or to perform various settings and is connected to a display device 218. The reader unit A may be provided with a CPU for performing other control, a RAM 215, and a ROM 216. These control the reader unit A.

Printer Unit

As shown in FIG. 1, the image forming apparatus 100 is a tandem intermediate transfer full color printer in which yellow, magenta, cyan, and black image forming units PY, PM, PC, and PK are arranged along an intermediate transfer belt 6 which is an intermediate transfer medium.

In the image forming unit PY, a yellow toner image is formed on a photosensitive drum 1Y and is primary-transferred to the intermediate transfer belt 6. In the image forming unit PM, a magenta toner image is formed on a photosensitive drum 1M and is primary-transferred to the intermediate transfer belt 6 so as to overlap the yellow toner image. In the image forming units PC and PK, a cyan toner image and a black toner image are formed on the photosensitive drums 1C and 1K, respectively, and the cyan toner image and black toner image are similarly overlappingly primary-transferred to the intermediate transfer belt 6 in sequence.

The four colors of toner images that have been primary-transferred onto the intermediate transfer belt 6 are conveyed to a secondary transfer unit T2 and are collectively secondary-transferred to a print material P. The print material P, after the four-color toner image is secondary-transferred thereto, is conveyed by a conveying belt 10, heated and pressurized by a fixing device 11 to thereby fix the toner image to its surface, and then is discharged to the outside of the device.

The intermediate transfer belt 6 is supported by a tension roller 61, a driving roller 62, and an opposing roller 63, and is driven by the driving roller 62 rotating in the direction of an arrow R2 at a predetermined process speed.

Print materials P drawn out from a print material cassette 65 are separated one by one by a separating roller 66 and fed to a resist roller 67. The resist roller 67 receives the print material P in a stopped state and stands by, and then feeds the print material P to the secondary transfer unit T2 at a timing aligned with the toner image on the intermediate transfer belt 6.

A secondary transfer roller 64 contacts the intermediate transfer belt 6 supported by the opposing roller 63 to form the secondary transfer unit T2. When a DC voltage having a positive polarity is applied to the secondary transfer roller 64, a toner image charged to a negative polarity and carried on the intermediate transfer belt 6 is secondary-transferred to the print material P.

The image forming units PY, PM, PC, and PK are configured to be substantially the same except that the colors of the toner used in developing apparatuses 4Y, 4M, 4C and 4K are yellow, magenta, cyan, and black. In the following description, subscripts Y, M, C, and K, attached to the reference numerals to indicate that the respective color are omitted when no particular distinction is required and an explanation is made collectively.

As shown in FIG. 1, a charging device 2, an exposure device 3, the developing apparatus 4, the primary transfer roller 7, and a cleaning device are arranged around the photosensitive drum 1 in the image forming unit.

In the photosensitive drum 1, a photosensitive layer that has a negative charge polarity is formed on the outer surface of an aluminum cylinder, and the photosensitive drum 1 rotates in the direction of the arrow at a predetermined processing speed. The photosensitive drum 1 is an OPC photosensitive member having a reflectance of about 40% for near-infrared light (960 nm). However, the photosensitive drum 1 may be an amorphous silicon-based photosensitive member or the like having about the same reflectivity.

The charging device 2 uses a scorotron charger, and irradiates the photosensitive drum 1 with charged particles accompanying a corona discharge to charge the surface of the photosensitive drum 1 to a uniform negative potential. The scorotron charger has a wire to which a high voltage is applied, a shield unit connected to ground, and a grid unit to which a desired voltage is applied. A predetermined charging bias is applied to the wire of the charging device 2 from a charge bias power source (not shown). A predetermined grid bias is applied to the grid unit of the charging device 2 from a grid bias power source (not shown). Although it also depends on the voltage applied to the wire, the photosensitive drum 1 is charged substantially to the voltage applied to the grid unit.

The exposure apparatus 3 scans a laser beam with a rotary mirror and writes an electrostatic image of an image on the surface of the charged photosensitive drum 1. A potential sensor (not shown), which is an example of a potential detection means, can detect the potential of an electrostatic image formed by the exposure apparatus 3 on the photosensitive drum 1. The developing apparatus 4 has a developing sleeve which rotates while carrying developing agent which includes the toner. The developing device 4 attaches the toner carried in the developing sleeve to the electrostatic image of the photosensitive drum 1, thereby developing the electrostatic image into the toner image.

The primary transfer roller 7 presses the inner surface of the intermediate transfer belt 6 to form a primary transfer unit T1 between the photosensitive drum 1 and the intermediate transfer belt 6. DC voltage of a positive polarity is applied to the primary transfer roller 7, whereby the negative polarity toner image carried on the photosensitive drum 1 is primary-transferred onto the intermediate transfer belt 6 passing through the primary transfer unit T1.

An image density sensor (patch detection sensor) 200 is disposed so as to face the intermediate transfer belt, and measures the image density of unfixed toner. In the present embodiment, the image density sensor is configured so as to be disposed to face the intermediate transfer belt, but it is also possible for it to be configured to be disposed as appropriate so as to face the photosensitive drum. The image density sensor disposed above the photosensitive drum, the intermediate transfer belt, or the like is a sensor for measuring the image density of unfixed toner. It is also possible to arrange, downstream of a fixing device, an image density sensor for measuring a fixed pattern image, and the invention is not limited to the image density sensor described in this embodiment.

The cleaning device causes a cleaning blade to rub against the photosensitive drum 1 to recover residual toner which failed to be transferred to the intermediate transfer belt 6 and remains on the photosensitive drum 1.

A belt cleaning apparatus 68 causes a cleaning blade to rub against the intermediate transfer belt 6, and collects residual toner that has failed to be transferred to the print material P, has passed through the secondary transfer unit T2, and has remained on the intermediate transfer belt 6.

Note, the photosensitive drum 1 of each color component may be provided with a potential sensor for measuring the potential on the surface thereof, and may be configured to output a signal indicating the potential.

Image Processing Unit

Figure 2:
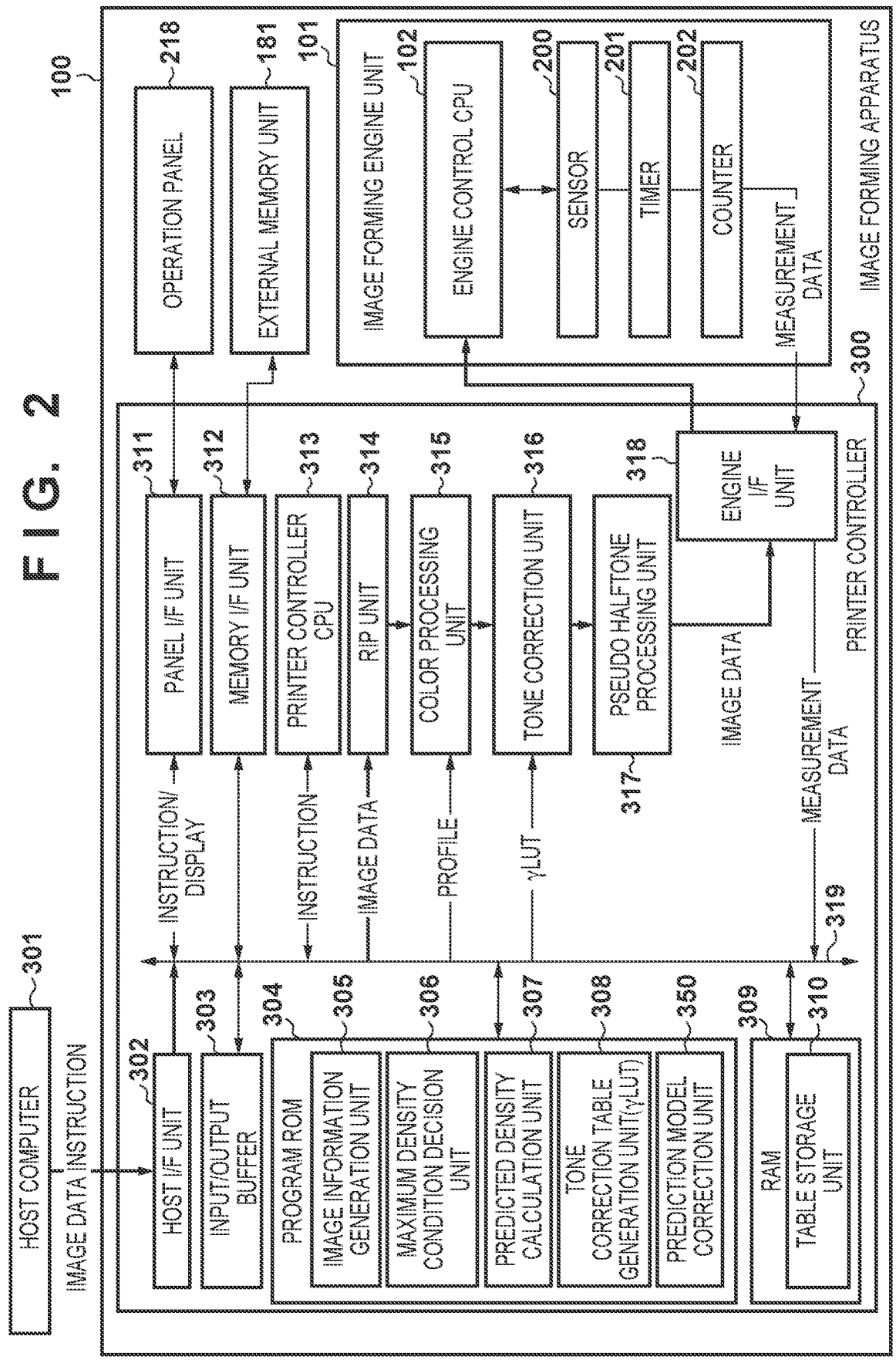
FIG. 2 is a printing system configuration diagram.

FIG. 2 is a diagram showing a configuration of a printing system according to the present invention. In the figure, reference numeral 301 denotes a host computer, and reference numeral 100 denotes an image forming apparatus. The host computer 301 and the image forming apparatus 100 are connected by a communication line such as USB 2.0 High-Speed, 1000Base-T/100Base-TX/10Base-T (conforms to IEEE 802.3).

In the image forming apparatus 100, a printer controller 300 controls overall operation of the printer. The printer controller 300 has the following configuration.

A host I/F unit 302 manages input and output to and from the host computer 301.

An input/output buffer 303 transmits and receives control codes from the host I/F unit 302 and data from various communication means.

A printer controller CPU 313 controls overall operation of the controller 300.

A program ROM 304 contains control programs and control data for the printer controller CPU 313.

A RAM 309 is used as a work memory for calculation necessary to interpret the above-described control codes and data and for printing, and for processing print data.

An image information generation unit 305 generates various image objects according to settings in data received from the host computer 301.

An RIP (Raster Image Processor) unit 314 expands an image object into a bitmap image.

A color processing unit 315 performs multi-order color conversion processing.

A gradation correction unit 316 executes single color gradation correction.

A pseudo halftone processing unit 317 performs dither matrix or error diffusion pseudo halftone processing or the like.

An engine I/F unit 318 transfers the converted image to an image forming engine unit.

An image forming engine unit 101 forms the converted image data as an image.

The flow of the image processing of the printer controller at the time of basic image formation is indicated by thick solid lines.

The printer controller 300 performs not only image formation but also various control calculations. A control program for this purpose is contained in the program ROM 304. The control program and data includes the following.

A maximum density condition decision unit 306 performs a maximum density adjustment.

A predicted density calculation unit 307 predicts the density based on an output value from a sensor or the like.

A gradation correction table generation unit (γLUT) 308 performs density gradation correction. The generated gradation correction table includes, for example, an output density value corresponding to an input density value as a correction value.

A prediction model correction unit 350 corrects a model for calculating a predicted density.

A detailed description of various control operations in the printer controller will be given later.

The gradation correction table may be referred to as an image correction condition. Also, since prediction is to perform a given operation based on a given parameter to determine a target value, the prediction may be referred to as a determination. Values acquired by prediction may be referred to as prediction results or determination results.

In addition, there is a table storage unit 310 for primary storage of adjustment results from the above-described maximum density condition decision unit 306, predicted density calculation unit 307, and gradation correction table generation unit 308. Further, there is the operation panel 218 which is for operating the printing apparatus and making instructions to execute the above-described correction process, and a panel I/F unit 311 which connects the printer controller 300 and the operation panel 218. Further, there is an external memory unit 181 used for storing print data and various information of the printing apparatus, and the like, a memory I/F unit 312 which connects the controller 300 and the external memory unit 181, and a system bus 319 which connects the respective units.

The image forming apparatus 100 further includes an image forming engine unit 101, which is controlled by an engine control CPU 102. In addition, the image forming engine unit 101 includes a first density sensor 200, a second density sensor 500, a timer 201, a counter 202, and the like.

Density Prediction Unit

Figure 3:
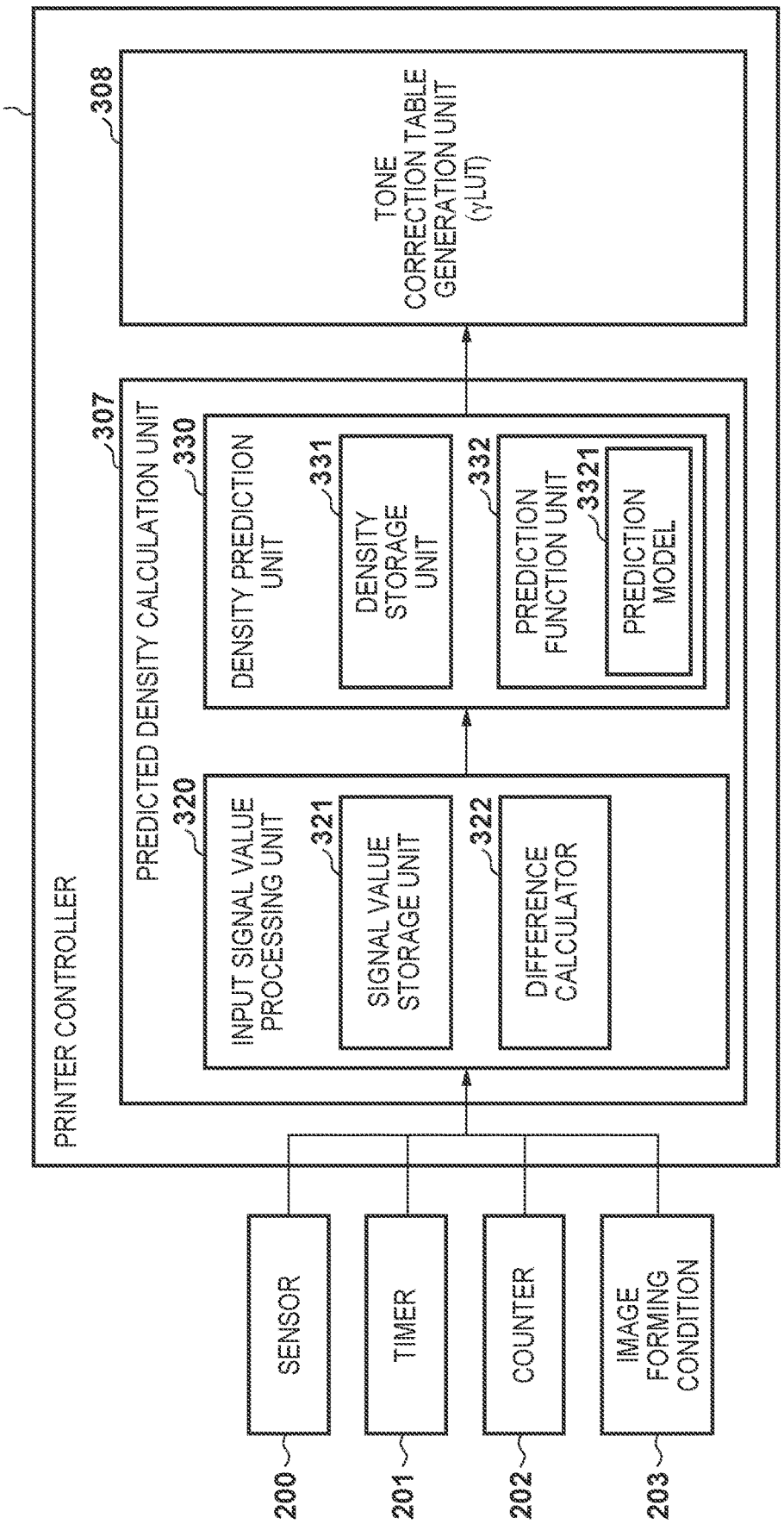
FIG. 3 is a block diagram of a density prediction unit according to the present invention.

Next, a predicted density calculation unit in the printer controller 300 will be described with reference to FIG. 3. Various signal values from the image density sensor 200, the timer 201, and the counter 202 of the image forming apparatus 100 and current image forming conditions 203 are inputted into a predicted density calculation unit 307 in the printer controller 300. The image forming conditions 203 include, for example, current exposure intensity (hereinafter referred to as LPW) and charging potential (hereinafter referred to as Vd) in the image forming apparatus 100 and the like. In addition, the temperature and the like in the device may be included. At this time, first, the signal value is inputted to an input signal value processing unit 320 in the predicted density calculation unit 307. The input signal value processing unit 320 includes a signal value storage unit 321 for storing a base signal value, and a difference calculation unit 322 for calculating a difference between the inputted signal value and the signal value stored in the signal value storage unit 321.

The signal value processed by the input signal value processing unit 320 is inputted to a density prediction unit 330. The density prediction unit 330 includes a density storage unit 331 that stores a base density, and a prediction function unit 332 that predicts a density from an input value from the input signal value processing unit 320. The prediction function unit 332 includes an image density prediction model (also referred to as the prediction model) 3321 for calculating from an input value a density change amount from a base density. The calculated density change amount and the base density stored in the density storage unit 331 are added to calculate the current predicted density. The image density prediction model 3321 will be described later. Further, acquisition of the base signal value and acquisition of the base density will be described later.

The calculated predicted density is inputted to the gradation correction table generation unit 308. The gradation correction table generation unit 308 generates a γLUT for input to the gradation correction unit 316 based on the predicted density. Note, the gradation correction method will be described later.

Prediction Model Correction Unit

Figure 4:
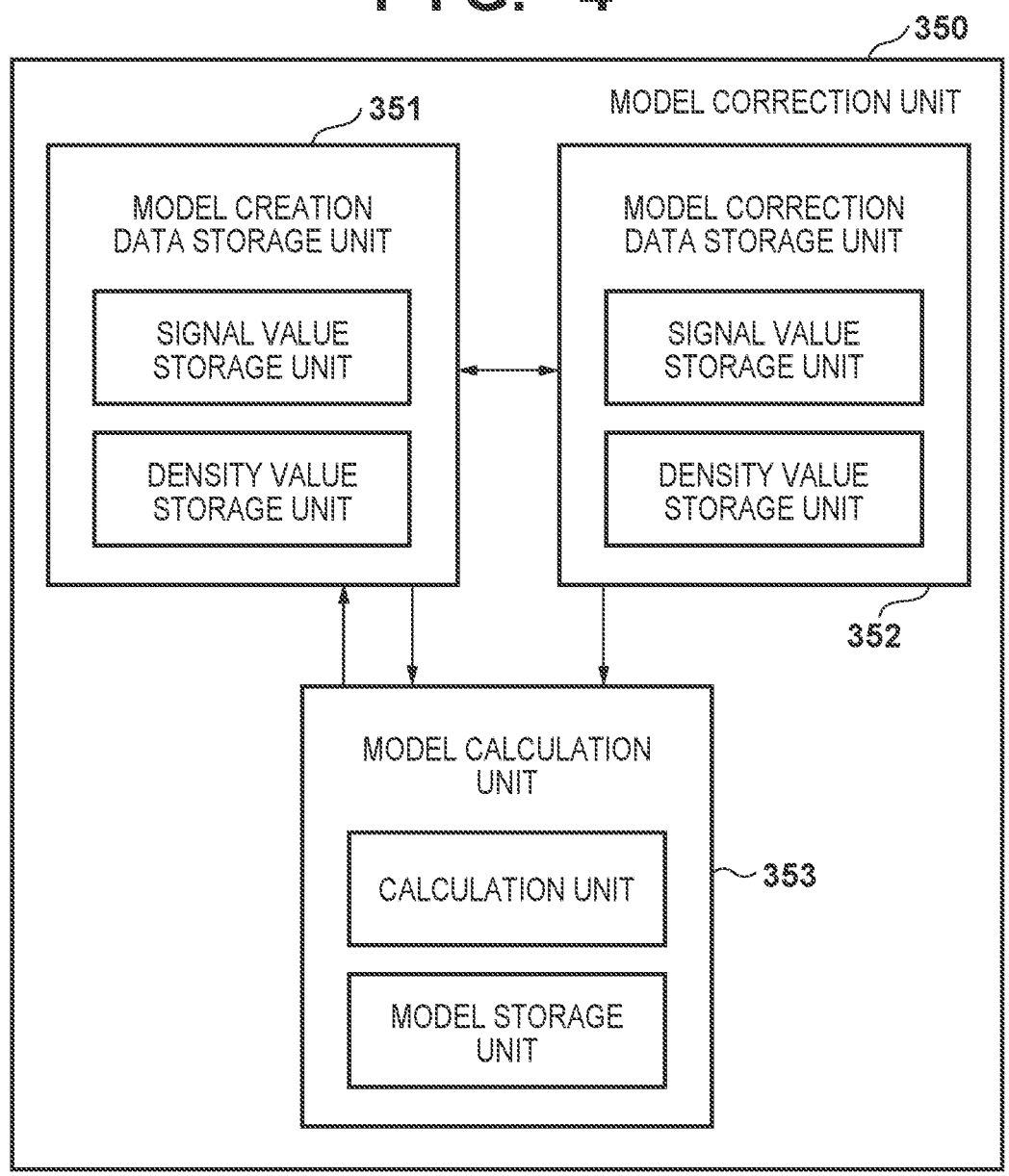
FIG. 4 is a block diagram of a prediction model correction unit according to the present invention.

Next, the prediction model correction unit 350 for correcting the model for calculating the predicted density will be described with reference to FIG. 4. Correction of the prediction model is performed by adding correction data to the data for which the current model is created, as will be described later. That is, the correction model is created by adding correction data. Therefore, the model creation data storage unit 351 that stores data when the current model is created includes a signal value storage unit that stores signal values such as sensors and conditions for creating a model, and a density value storage unit that is paired with the signal value storage unit. It should be noted that the current model refers to a base model (or initial model) that has been initially created in a state where no correction has been made, and to a latest corrected model in a state where a correction has been made.

A model correction data storage unit 352 stores newly acquired correction data. The model correction data storage unit 352 also includes a signal value storage unit for storing a signal value, and a density value storage unit for storing a density value paired with the stored signal value.

Furthermore, the model calculation unit 353 for determining a new model using these data includes a calculation unit for creating a new model and a model storage unit for storing the created model. When the model correction is completed, the relationship between the signal value and the density value is stored in the model creation data storage unit as a data set. The prediction model correction unit 350 described here can be realized by being included in an image forming apparatus or by being included in an apparatus connected to an image forming apparatus via a network.

Base Signal Values and Base Densities Acquisition

Figure 5:
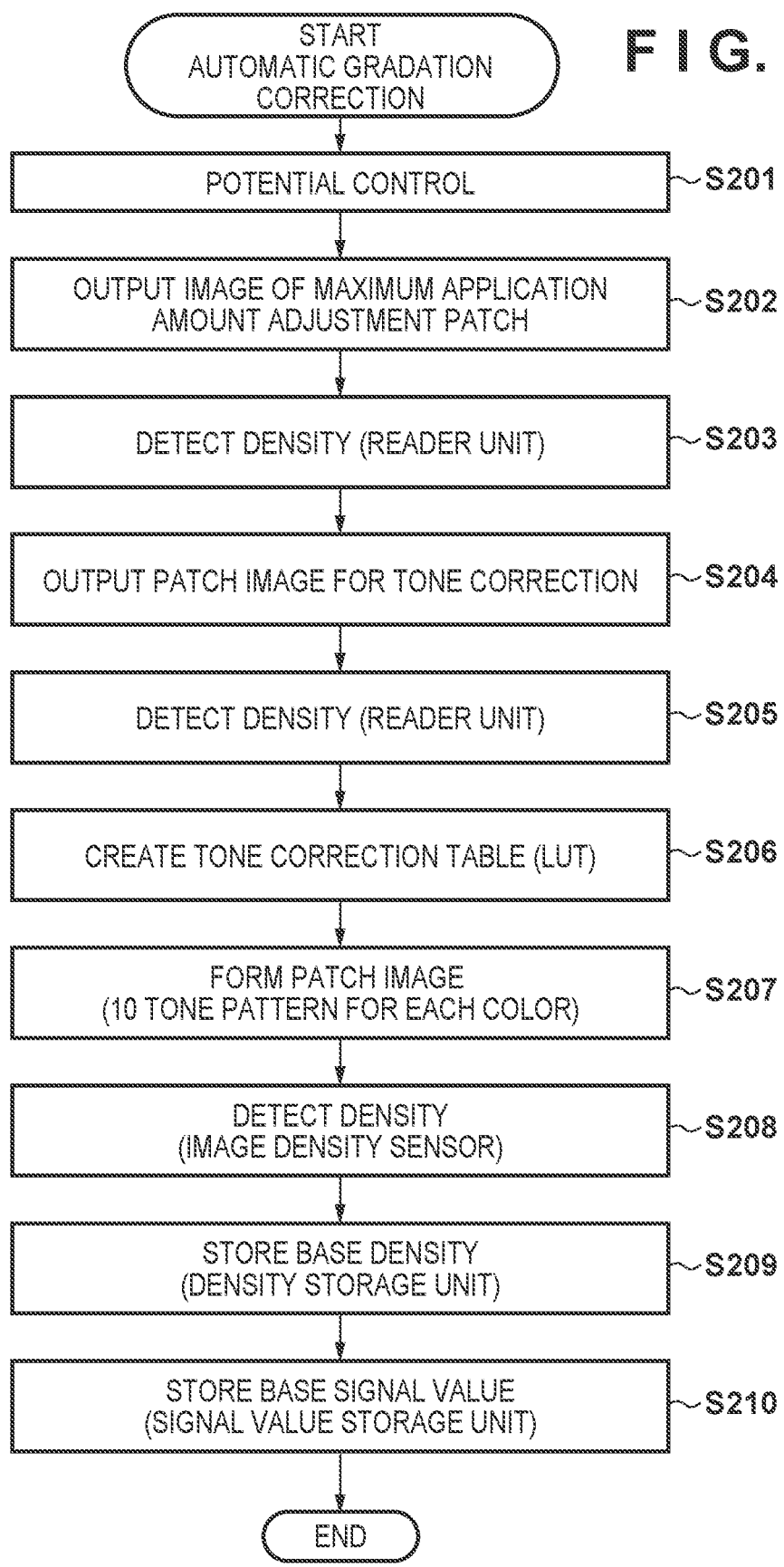
FIG. 5 is a view illustrating a flow when the automatic gradation correction is executed in the embodiment.

Next, a method for acquiring base signal values stored in the signal value storage unit 321 and base densities stored in the density storage unit 331, which are described above for the density prediction unit 330, will be described. As an example, the base density used in the present embodiment is acquired by automatic gradation correction using an output image formed on a sheet (a toner image after fixing), which is periodically performed as shown in FIG. 5. In the present embodiment, a system having a potential sensor for measuring the potential on the drum surface is described, but the present invention is not limited thereto.

Potential Control

When the automatic gradation correction control is started freely by a user, firstly, potential control processing (step S201) starts. The engine control CPU 102 determines a target charging potential (VdT), a grid bias (Y), and a development bias (Vdc) by potential control prior to printing on sheets (media, e.g., paper). By the potential control processing, it is possible to determine a charging potential or the like in accordance with environmental conditions in which the image forming apparatus 100 is installed (including conditions of temperature and humidity). The engine control CPU 102 may be referred to as an engine control unit 102.

Figure 6:
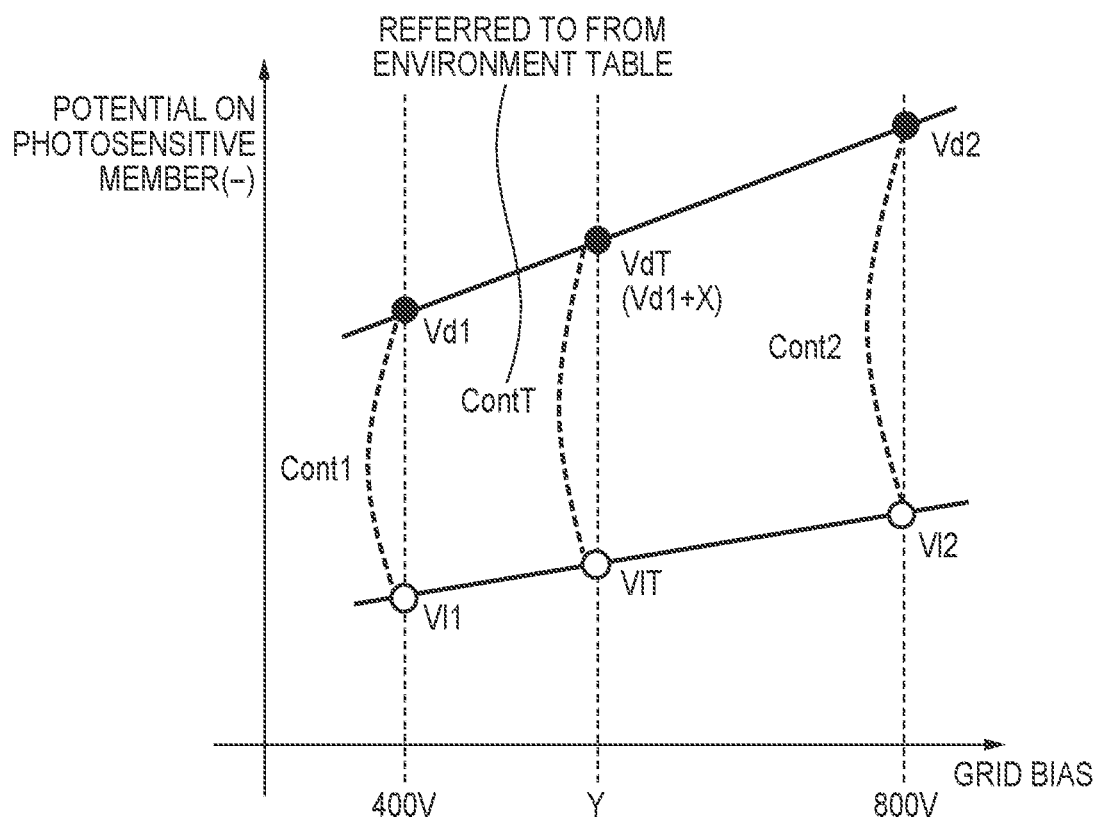
FIG. 6 is a conceptual explanatory diagram of two-point potential control in the embodiment.

In the present embodiment, the engine control CPU 102 performs potential control called two-point potential control. FIG. 6 is a diagram illustrating the concept of two-point potential control. In FIG. 6, the horizontal axis represents the grid bias, and the vertical axis represents the photosensitive member surface potential. Vd1 represents the charging potential under a first charging condition (grid bias 400V), and Vl1 represents the potential of an exposure unit formed by a standard laser power. Vd2 represents the charging potential under a second charging condition (grid bias 800V), and Vl2 is the potential of the exposure unit formed by a standard laser power at that time. Contrast potentials (Cont1, Cont2) at the grid biases of 400V and 800V can be calculated with equations (1) and (2).

$$(Cont1)=(Vd1-Vl1) \qquad (1)$$

$$(Cont2)=(Vd2-Vl2) \qquad (2)$$

Here, the increase (ContΔ) in contrast potential for every 1V of charging potential can be calculated by equation (3) based on the results of equations (1) and (2).

$$(ContΔ)=((Cont2-Cont1)/(Vd2-Vd1)) \qquad (3)$$

Meanwhile, an environment sensor (not shown) is provided in the image forming apparatus 100, and the environment sensor measures environmental conditions of the temperature and humidity in the image forming apparatus 100. The engine control unit 102 obtains the environmental conditions (for example, an absolute moisture amount) in the image forming apparatus 100 based on the measurement result of the environmental sensor. Then, a target contrast potential (ContT) corresponding to the environmental condition is referred to from an environment table registered in advance.

The relationship between the target contrast potential (ContT) and the increase in contrast potential (ContΔ) can be calculated with equation (4).

$$ContT=Cont1+X \cdot ContΔ \qquad (4).$$

When a parameter "X" satisfying the relationship of equation (4) is calculated, the target charging potential (VdT) (hereinafter, also referred to as "target potential") can be calculated with equation (5).

$$VdT=Vd1+X \qquad (5).$$

The charging potential change amount (VdΔ) per 1V of grid bias can be calculated with equation (6).

$$(VdΔ)=(Vd2-Vd1)/(800-400) \qquad (6).$$

The grid bias (Y) for applying the target potential (VdT) can be calculated from equation (7).

$$\text{Target } VdT=400+Y \cdot VdΔ \qquad (7).$$

In equation (7), VdΔ can be calculated with equation (6), and VdT can be calculated with equation (5). Therefore, the grid bias (Y) satisfying the relationship of equation (7) can be finally determined by substituting potentials known from equations (5) and (6).

Through the above processing, it is possible to determine the target potential (VdT) and the grid bias (Y) according to the environmental conditions. The development bias (Vdc) has a specified potential difference with respect to the target potential (VdT), and can be calculated by subtracting the specified potential from the determined target potential (VdT).

At the determined development bias (Vdc), subsequent image formation is performed. The potential on each drum is negative, but the negative is omitted here in order to make the calculation process easier to understand.

With the above processing, the potential control processing of step S201 of FIG. 5 is completed.

Maximum Toner Application Amount Adjustment

Next, the process proceeds to step S202, and a patch image for adjusting a maximum toner application amount is formed (step S202) using the grid bias (Y) determined by the potential control in the preceding step S201 and the developing bias (Vdc).

In a printer that prioritizes productivity, the flow described below is omitted, and the flow may adjust the maximum application amount only by the potential control. However, since the color material charge retention amount in the developer, the ratio at which the toner and the carrier are mixed, and the like also change depending on the environment and durability, potential control alone is of low accuracy. Therefore, in the present embodiment, a patch image for which exposure intensity (hereinafter referred to as LPW) is changed in several stages is formed, and an LPW to be used for normal image formation is determined.

Figure 7:
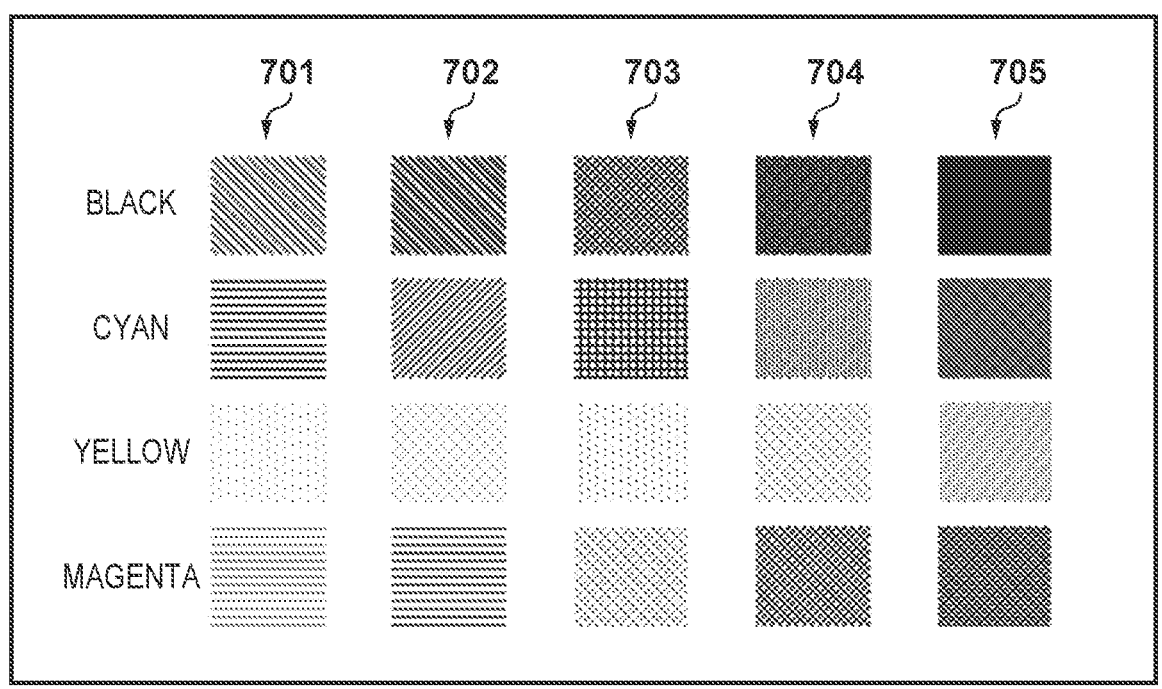
FIG. 7 is a view illustrating one example of a maximum toner application amount correction chart in the embodiment.

The image forming apparatus 100 in which the grid bias (Y) and the development bias (Vdc) are determined forms five patch images ((1) to (5)) for each color (black, cyan, yellow, magenta) as shown in FIG. 7, in order to adjust the maximum application amount. The number of patches is not limited to this. The conditions for forming the five patch images are each different in LPW, and are LPW1, LPW2, LPW3 (corresponding to the standard laser power when used for potential control), LPW4, and LPW5 in order from the left. Laser power increases from LPW1 to LPW5 in order. Also, the number of colors of the patch may accord to the number of color components used in the image forming apparatus 100, and is not limited to four.

Figure 8:
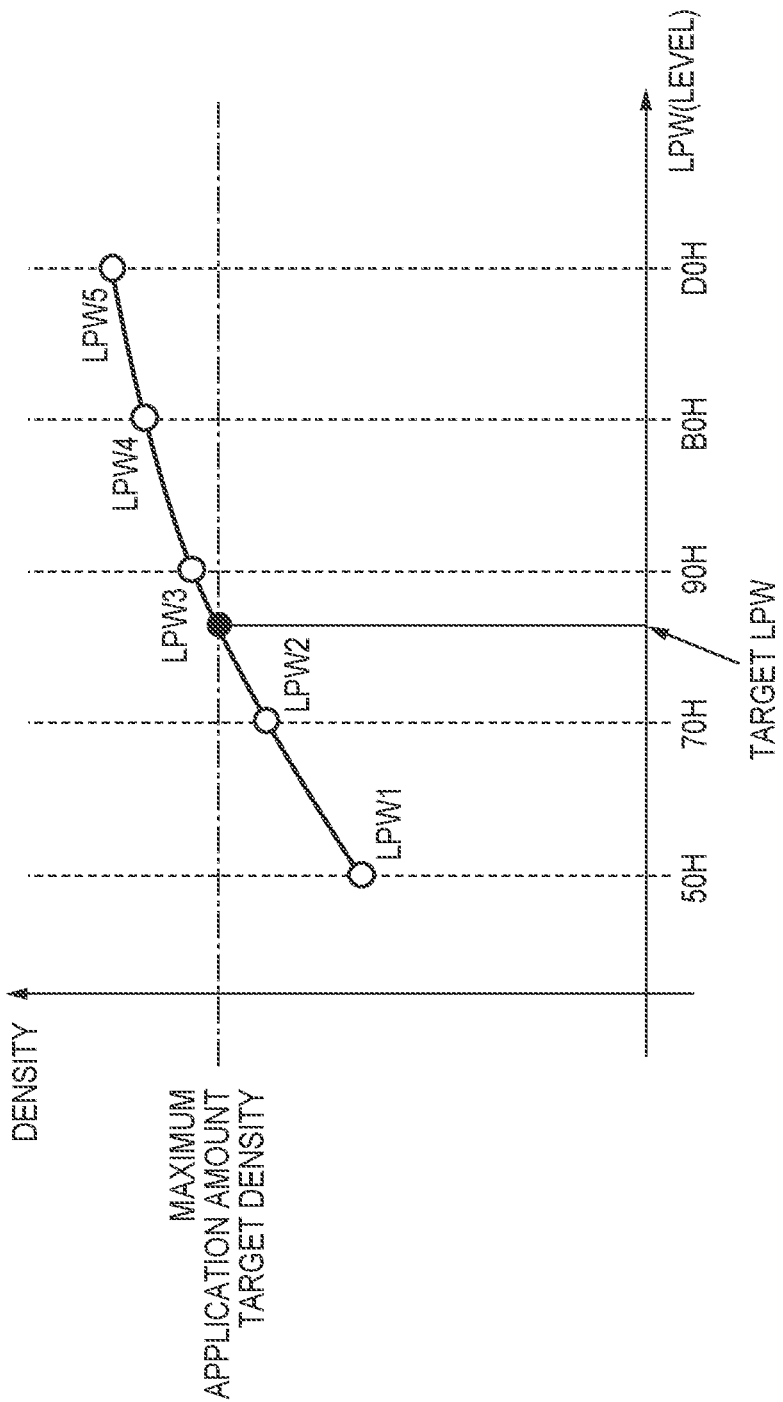
FIG. 8 is a conceptual explanatory diagram of a determination of an exposure intensity at a time of maximum toner application amount correction in the embodiment.

A user sets the outputted sheet in the reader unit, and the density of the image pattern is automatically detected (step S203). FIG. 8 is a diagram showing the relationship between the density value and the LPW of each patch image. The toner application amount can be adjusted by controlling the LPW in accordance with a density target value (hereinafter, also referred to as "the maximum application amount target density value") which sets a detected density value as the target.

Gradation Correction and Base Value Acquisition

When the adjustment of the maximum toner application amount is completed, the gradation characteristics are corrected next. Here, using the previously determined grid bias (Y), development bias (Vdc), and LPW level, an image pattern of 64 gradations of each color is formed and outputted onto a sheet (step S204). Also, the gradation count is not limited to this.

A user sets the outputted image in the reader unit, and the density of the image pattern is automatically detected (step S205).

Figure 9:
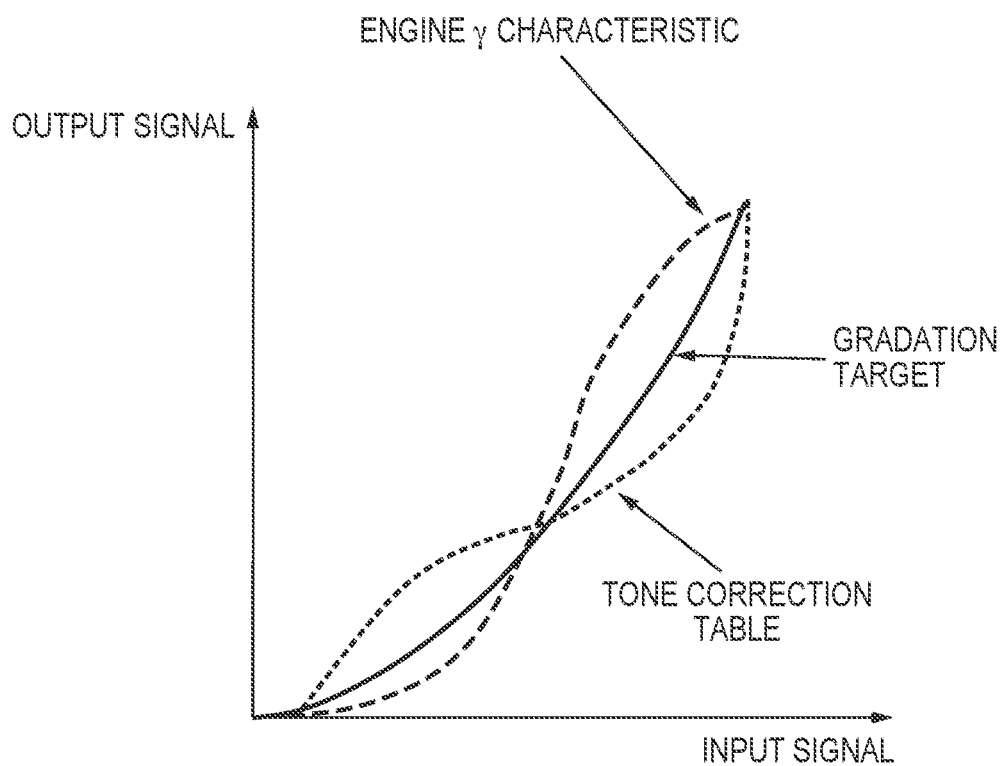
FIG. 9 is a view illustrating a gradation correction table at a time of automatic gradation correction in the embodiment.

From the density obtained from the image pattern, interpolation processing and smoothing processing are performed to obtain an engine $\gamma$ characteristic of the entire density region. Next, using the obtained engine $\gamma$ characteristic and a preset gradation target, a gradation correction table for converting the input image signal into an image signal for output is created (step S206). In the present embodiment, as shown in FIG. 9, inverse conversion processing is performed so as to match the gradation target to create a gradation correction table.

When this work is completed, the density on the paper is matched to the gradation target over the entire density region.

The target LPW determined by the above procedure is applied, and a toner image pattern including a test image (also referred to as a measurement image) of a plurality of gradations is formed for each color component using the gradation correction table (step S207). If the density of the test image is detected on the intermediate transfer member by using the image density sensor 200 (step S208), that density value becomes the target density on the intermediate transfer member, and is stored in a density storage unit 331 as the base density (step S209). In the present embodiment, after the gradation correction table is created, a test image of 10 gradations of each color is formed, the test image is measured using the image density sensor 200, and the result (a measured value, for example) is stored as a base density in the density storage unit 331. The density storage unit 331 stores measurement results of the image density sensor 200 that vary according to the density of the test image. In this case, the data stored in the density storage unit 331 is test image density values. Note that the density values may be stored, for example, together with a density value before or after a gradation correction corresponding to that density. However, it is necessary to decide which. If test images to be formed are determined in advance, a detected density value for each test image may be stored without association with a density value. The base density value is referenced during calibration.

Further, sensor, output, counter, and timer values, and the image forming conditions such as the grid bias, the developing bias, and the LPW level when the base density is acquired by performing the automatic gradation correction are stored as the base signal values in a signal value storage unit 321 (step S210). Referring to the base density, the engine $\gamma$ characteristic, and the base signal values thus obtained, the gradation correction table (LUT) is updated as described below.

Note that since the image density prediction model is assumed to be a model for predicting density of a test image such as a patch on an intermediate transfer member in the present embodiment, density values measured on the intermediate transfer member is stored as base density values. However, in the case of a model for predicting density of a test image on a printing medium, for example, a density of a test image on a storage medium is measured by the reader unit A as the base density value (base density value) and stored. The base density may be appropriately selected depending on the position of the patch density being handled, and the image density prediction model is not limited to the above. Note that a density sensor provided on the sheet conveying path may be used instead of the reader unit A.

Density Correction Control

Overview of Control Timing of Actual Measurement Control and Prediction Control

In the procedure of FIG. 5, a base gradation correction table is prepared, and a base density and a base signal value are stored. The gradation correction table needs to be updated in accordance with a change in color tone or a change in density that occurs in accordance with the degree of use of the image forming apparatus. For this reason, in the present embodiment, density correction by actual measurement control and density correction by prediction control are used in combination.

Execution of a density correction sequence according to actual measurement control in which a density patch is formed on the intermediate transfer belt and the density patch is read by an image density sensor such as a density sensor often interrupts an image formation sequence (typically a print operation), which is one cause of lower productivity. Meanwhile, executing actual measurement control at a lower frequency in consideration of lower productivity leads to worse image quality because it neglects variation in color tone and/or density. Accordingly, the control timing of the actual measurement control is set in consideration of a balance in color tone/density variation and productivity in conventional image forming apparatuses. Although it may be possible, depending on the configuration of the main body, to improve the frequency of the measurement control by forming a density patch outside the image forming range, it is difficult to increase the frequency of the measurement control because performing the measurement control at a high frequency may lead to an increase in the amount of toner used, that is, an increase in cost.

However, by executing density prediction control, it is possible to compensate the density correction between actual measurements and suppress color tone and density variation. For example, by periodically performing a density correction according to actual measurement control and also performing prediction control density correction at a higher frequency than the density correction according to the actual measurement control, it is possible to better suppress color tone variation since density correction can be executed at a high frequency. Also, since prediction control does not accompany test image formation and reading, productivity does not suffer.

Method for Generating (Updating) a LUT at the Time of Predicted Density Correction Next, a method of reflecting the calculated density values into the LUT in the prediction control will be described. First, at the time of the automatic gradation correction performed arbitrarily by the user (FIG. 5), a gradation correction table (hereinafter referred to as the base correction LUT) is formed in accordance with the engine γ characteristic for gradation targets (hereinafter referred to as the gradation LUT) set in advance. Thereafter, the base density value for 10 gradations of each of the colors described above is acquired. After automatic gradation correction, input image data is subjected to conversion by this initial correction LUT and inputted into the engine, adjusted to the engine γ characteristic and output to become a target gradation LUT.

Figure 10:
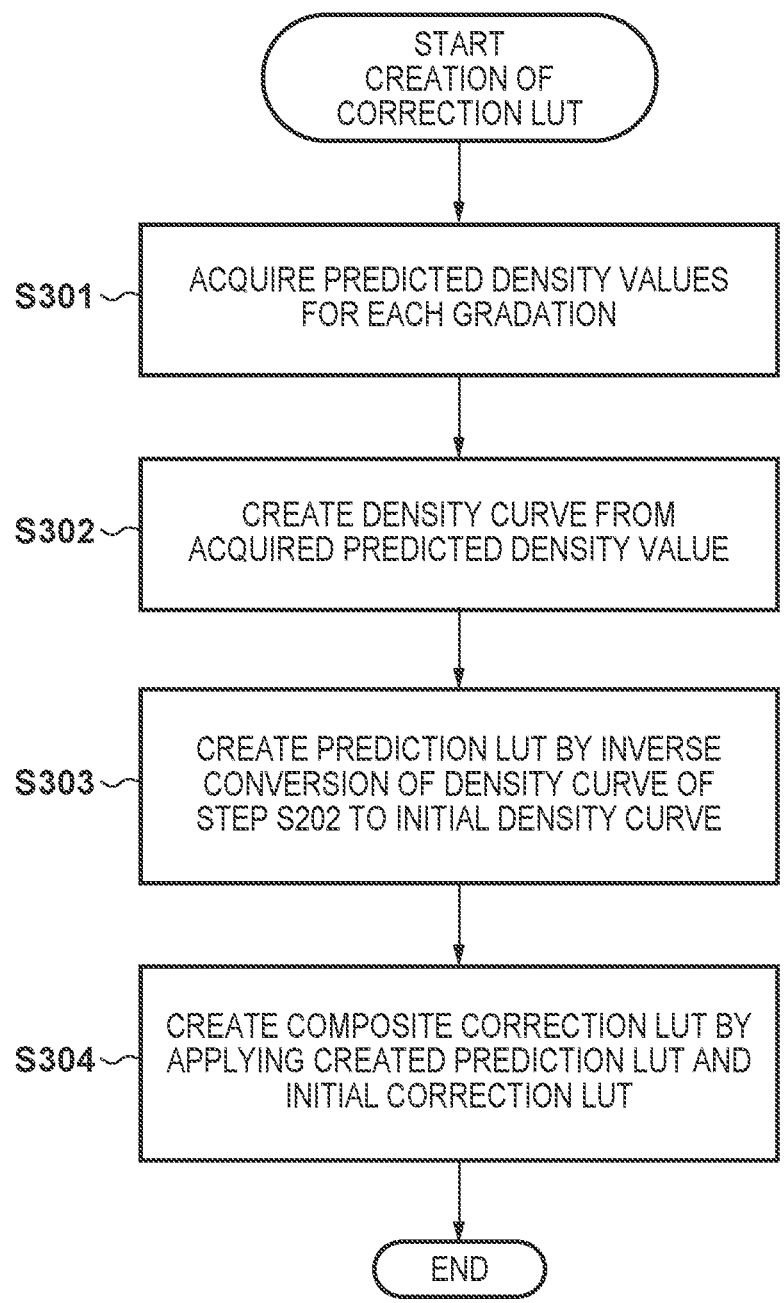
FIG. 10 is a view illustrating a flow for creating a correction LUT from a density prediction value in the embodiment.
Figure 11:
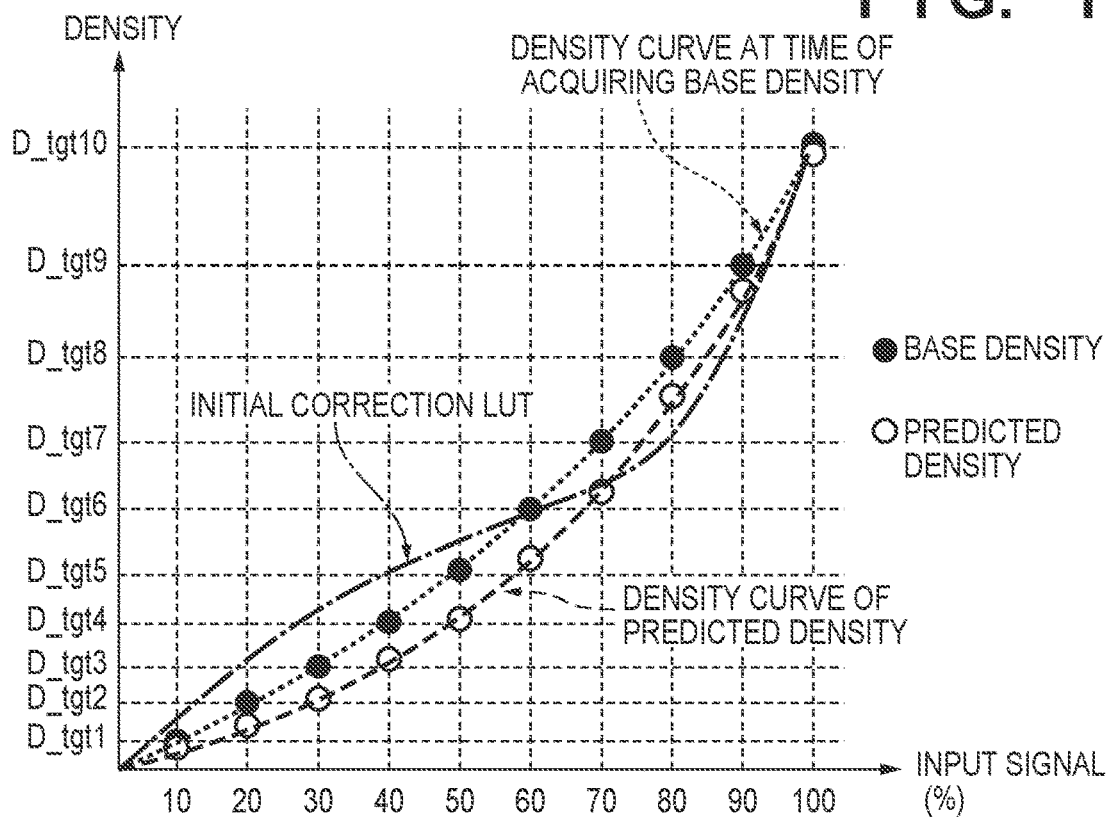
FIG. 11 is a view illustrating a relationship of an initial correction LUT and a base density curve and a predicted density curve in the embodiment.

Thereafter, density values are acquired at a timing set in advance such as when an activation condition for density correction control is satisfied, such as when the power source is turned on, when returning from a sleep, at the time of an environmental variation, and a LUT (hereinafter referred to as a composite correction LUT) at the time of image output is created using the acquired density value. A method of creating a composite correction LUT will be described with reference to FIGS. 10, 11, 12, and 13. FIG. 10 is a flow diagram for creation of a composite correction LUT. The process of FIG. 10 is performed, for example, by a printer controller CPU 313. A density curve described below is a curve indicating a correspondence relationship between the input signal value representing the density and the printed density value (or predicted density value). The density curve may be realized by, for example, a table in which input values and density values are associated with each other. The process of FIG. 10 is executed, for example, at a predetermined prediction control timing. More specifically, the process may be executed every time printing to a predetermined number of sheets (or the number of faces) is completed.

First, the printer controller CPU 313 acquires predicted density values for the test image (step S301). Acquisition of the predicted densities will be described later with reference to FIG. 15. Next, the printer controller CPU 313 plots the acquired predicted density values for each gradation, and creates a density curve (dashed line) for the predicted density values indicated by ○ points in FIG. 11 (step S302). In order to correct the density curve of the predicted density values to an initial density curve, the printer controller CPU 313 performs an inverse conversion, and generates a LUT for correction as indicated by a long dashed line in FIG. 12 (step S303).

Figure 12:
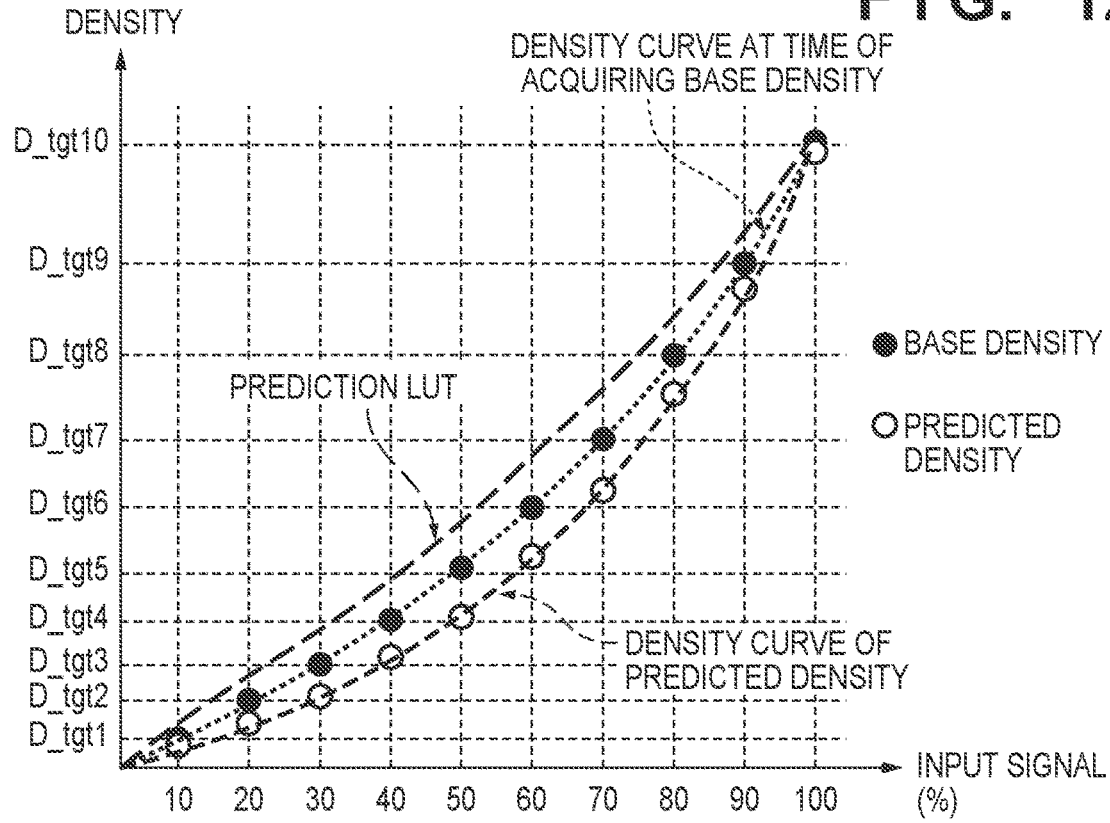
FIG. 12 is a view illustrating a prediction LUT created from a predicted density curve in the embodiment.

Here, the initial density curve corresponds to the density curve of the acquired the base density shown in ● points in FIG. 12. This may be realized by a table in which input signal values and base density values stored in the density storage unit are associated with each other. The curves of the initial correction LUT illustrated in FIG. 11 and FIG. 13 indicate a characteristic for correcting an input signal value so that a relationship between the input signal value and the density is as in the initial density curve when an image is formed based on an output signal value obtained by converting the input signal value with the initial correction LUT. On the other hand, the prediction LUT shown in FIG. 12 is an LUT for converting a predicted density curve (characteristic) corresponding to an input value into a base density curve (characteristic).

Figure 13:
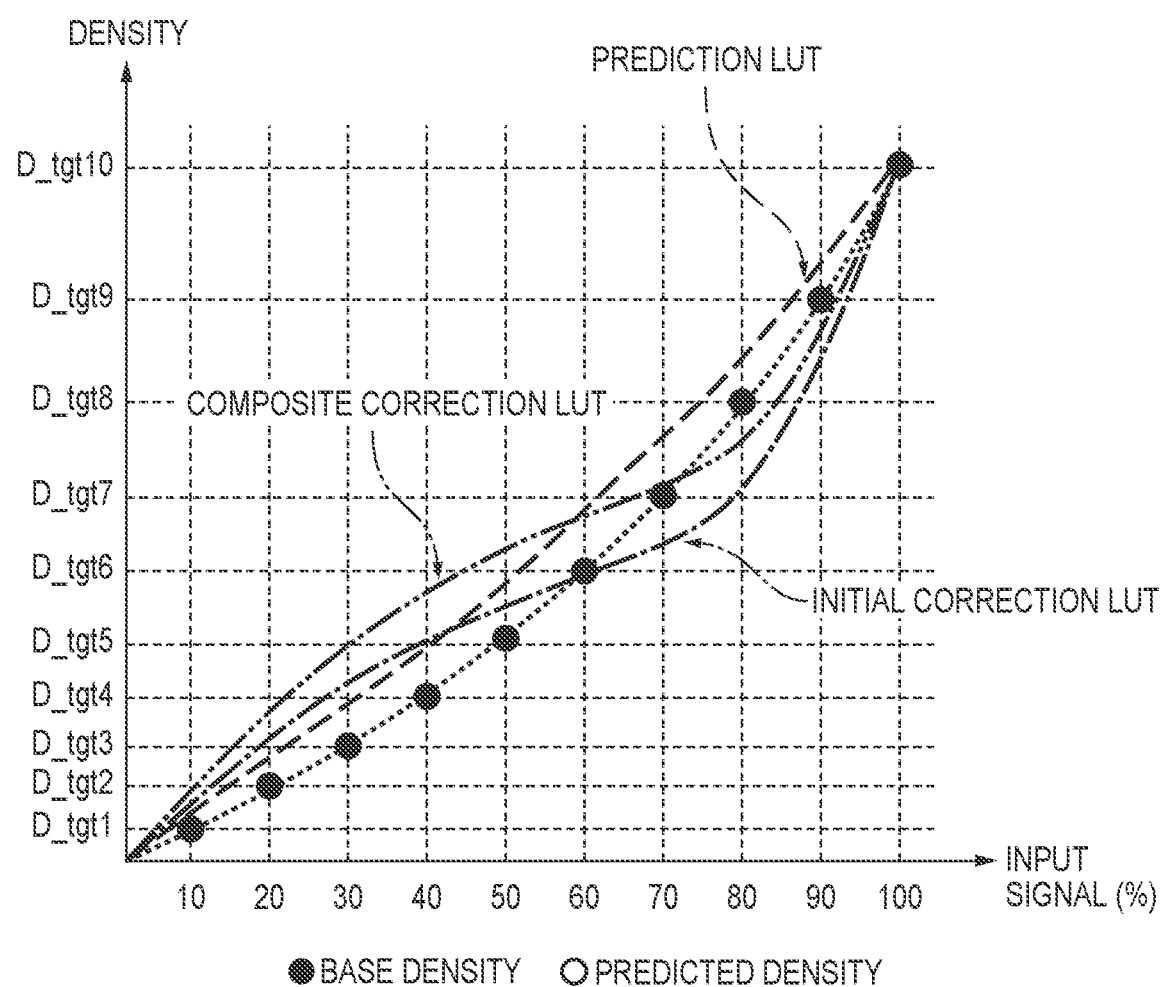
FIG. 13 is a view illustrating a relationship of an initial correction LUT and a prediction LUT and a composite correction LUT in the embodiment.

Finally, the printer controller CPU 313 combines (i.e., composites) the prediction LUT and the initial correction LUT to generate a composite correction LUT as shown by the long-and-double-short dashed line in FIG. 13 (step S304). The generated composite correction LUT is transferred to, for example, the gradation correction unit 316 and used for gradation correction. The input signal is converted to an output signal by this composite correction LUT, the output signal is reflected in the output image, and the image is output. The density curve may be generated by a commonly used approximation method such as using an approximation formula that connects 10 points.

Predicted Density Calculation

Figure 15:
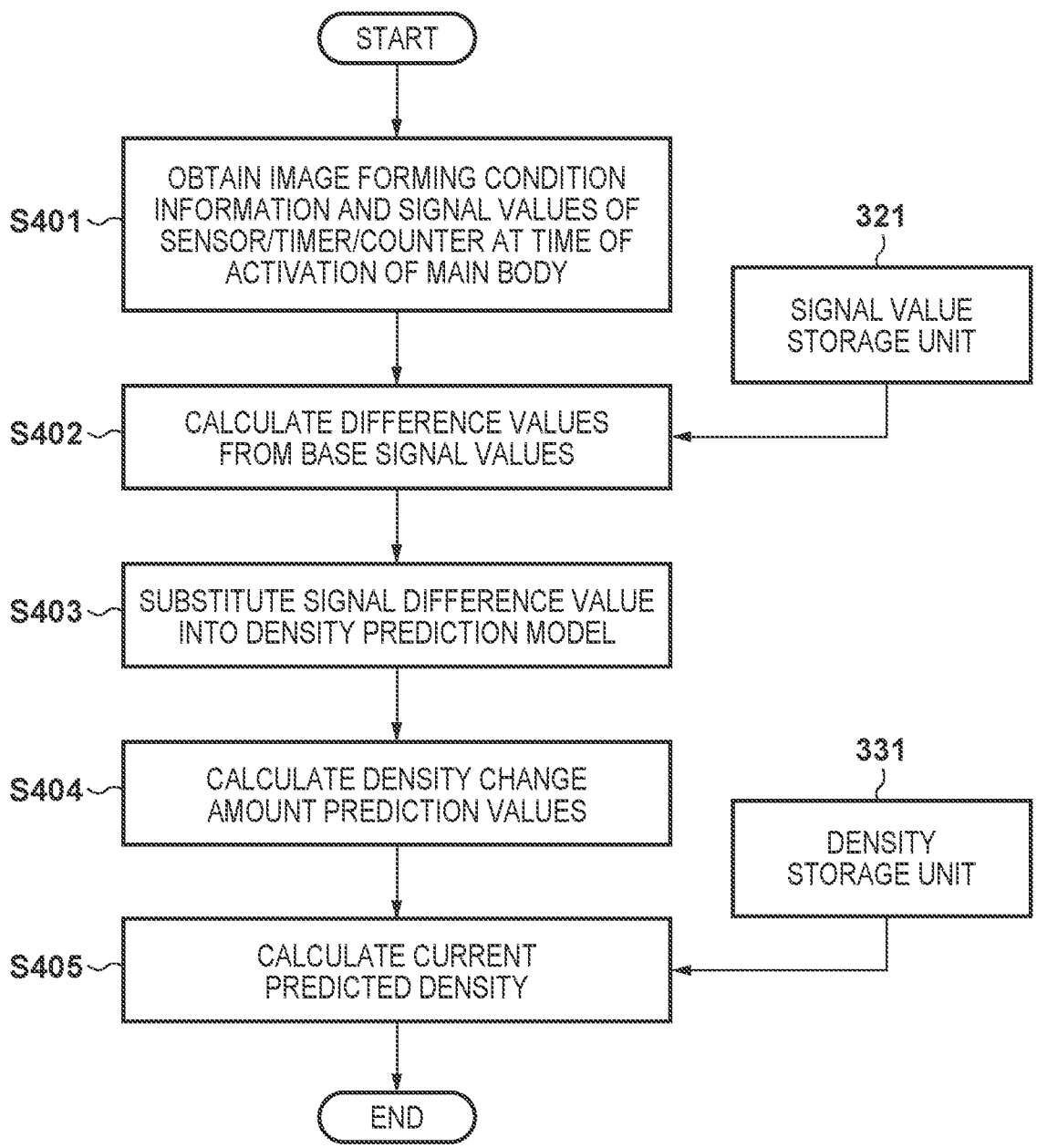
FIG. 15 is a view illustrating a flow for calculating a predicted density from the image density prediction model in the embodiment.

The flow for calculating the predicted density value in step S301 is as in FIG. 15. In the method of FIG. 15, a flow for predicting density when an activation condition for predicted density correction control is satisfied in a state in which base signal values and base densities have been acquired in advance.

Firstly, when the predicted density correction control is activated, the printer controller CPU 313 acquires, as an input signal value, information such as environmental values, a standing time, and a number of times toner replenishment has been performed at the time of activation, and information of an image forming condition for performing image forming, from a sensor, timer, and counter provided in the image forming apparatus (step S401). The present invention is not limited to a configuration of acquiring information using the timer 202 and the counter 203, and the printer controller CPU 313 may be configured to acquire time information and count information. The printer controller CPU 313 extracts a difference between the acquired signal values and pre-stored base signal values (step S402).

Next, the printer controller CPU 313 substitutes (step S403) the extracted difference values into an image density prediction model equation created based on advanced study, and calculates (step S404), as prediction values, difference values of the current densities from the base densities. The printer controller CPU 313 calculates a current predicted density value from the sum of a difference prediction value and a base density value, and acquires a γ characteristic (step S405). The process of creating the image density prediction model will be described later with reference to FIG. 16.

Method for Generating LUT when Correcting Measured Density

Figure 20:
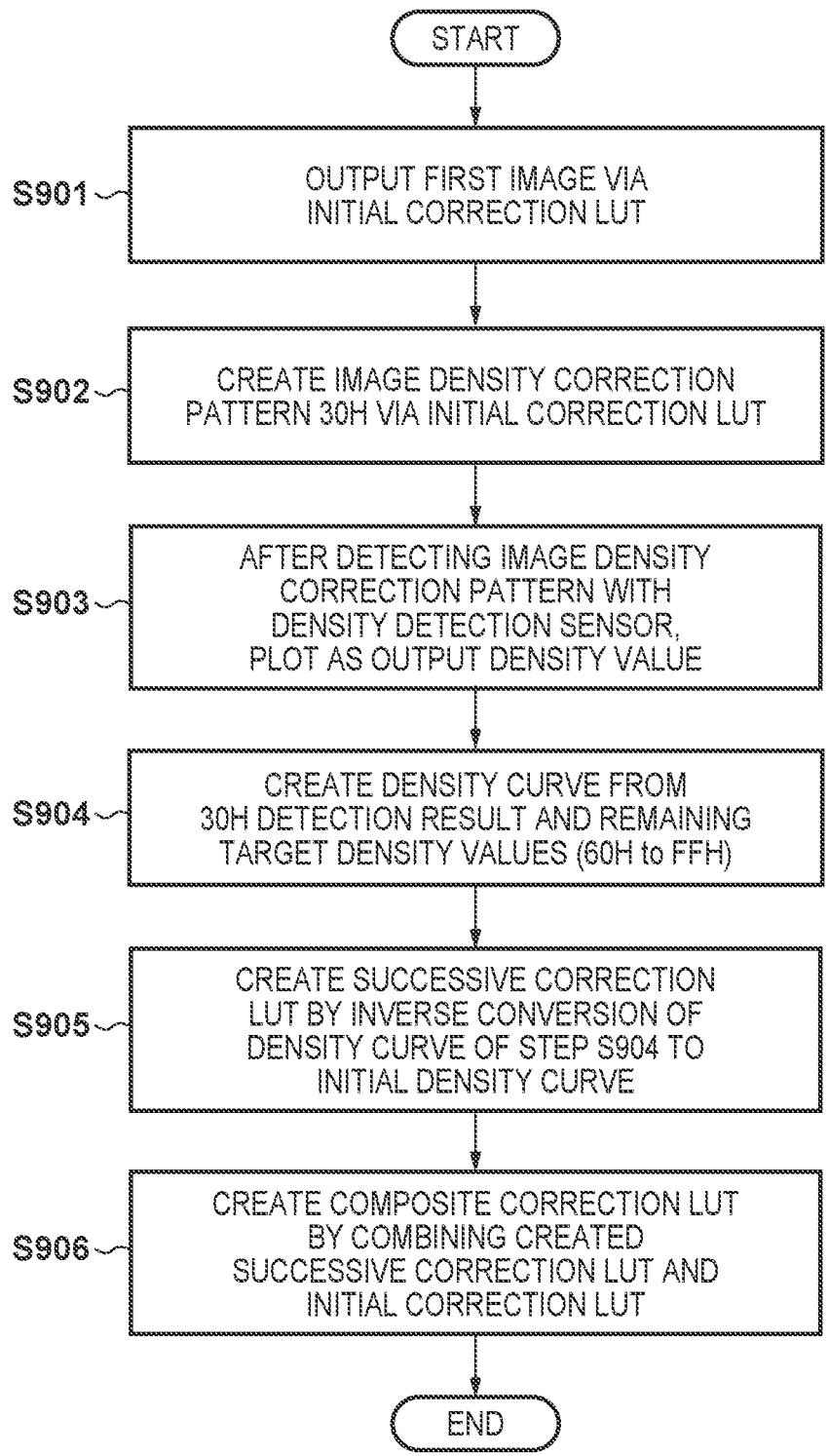
FIG. 20 is a flow for creating a composite LUT at a time of actual measurement control in the embodiment.
Figure 21:
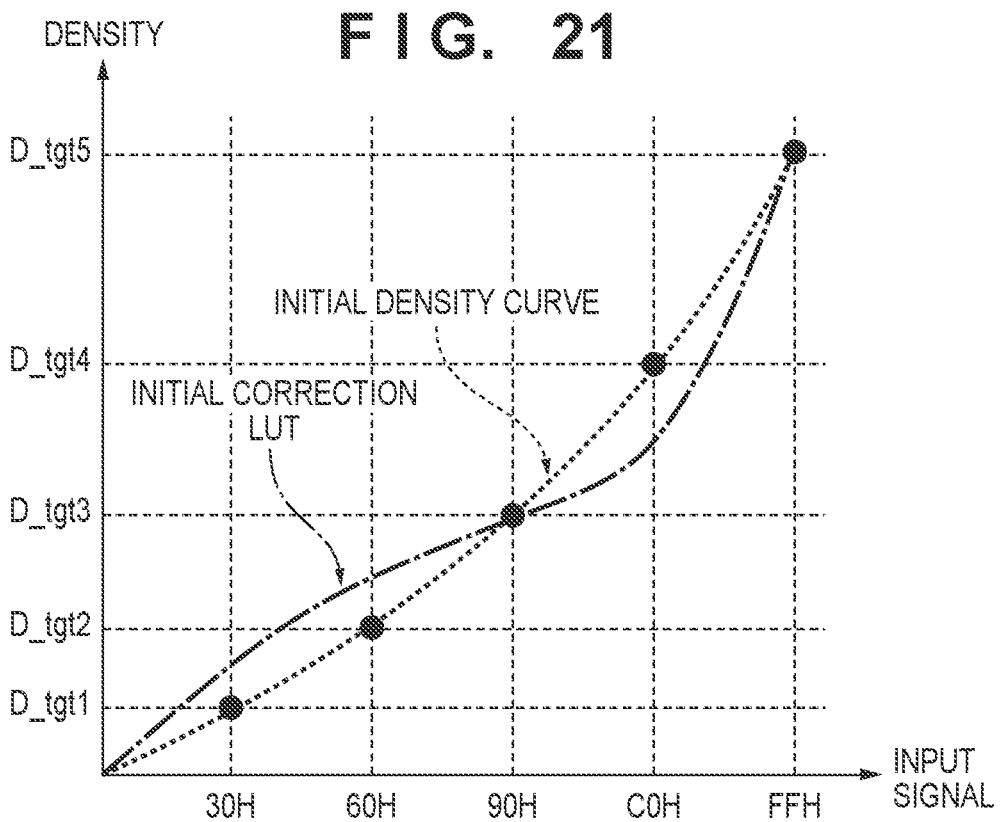
FIG. 21 is a view illustrating a relationship of each LUT at a time of actual measurement control in the embodiment.

A method of creating a composite correction LUT when a patch image for density correction is created and the density is detected will be described using the processing flow of FIG. 20 and the density characteristic views of FIGS. 21, 22, and 23. In the present embodiment, a method in which patch images whose input values are 30H, 60H, 90H, C0H, and FFH are corrected sequentially will be described, but the invention is not limited thereto. The process of FIG. 20 is performed, for example, by the printer controller CPU 313. The process of FIG. 20 is executed, for example, at a predetermined actual measurement control timing. More specifically, the process may be executed every time printing to a predetermined number of sheets (or the number of faces) is completed. However, the period or spacing may be longer than the period or spacing of the density correction by the prediction control, and preferably may be several times that of the density correction or so.

Patch images are created by applying the current correction LUT. After the automatic gradation correction, the CPU 313 of the printer controller creates the patch images by applying the initial correction LUT as shown in FIG. 21, which is obtained at the time of the automatic gradation correction, to a test image having a fixed density for density correction, for example, an image with a density value of 30H for each color component (step S901 and step S902). The printer controller CPU 313 forms an image of the created pattern, detects the pattern by a density detection sensor (for example, the density sensor 200), and plots the detection result as a detected density for 30H (step S903). Upon the printer controller CPU 313 detects the density value, the printer controller CPU 313 newly plots in the 30 H portion of the initial target density value as indicated by the ○ mark in FIG. 22. That is, the printer controller CPU 313 associates the input value 30 H with the detected density value. For 60H, 90H, C0H, and FFH, the density target value taken immediately after creating the initial correction LUT is used. The printer controller CPU 313 creates a density curve as with the long-and-double-short dashed line illustrated in FIG. 23 by using this newly plotted measured 30 H density value and the base densities of the initially measured density values 60H, 90H, C0H, and FFH (step S904). The base density values can be obtained from the density storage unit 331. The density curve may be generated by a commonly used approximation method such as using an approximation formula that connects 5 points.

Next, the printer controller CPU 313 performs an inverse conversion in order to correct the current density curve created in step S904 to the initial density curve, and creates a successive correction LUT as indicated by the dashed line illustrated in FIG. 23 (step S905).

Figure 22:
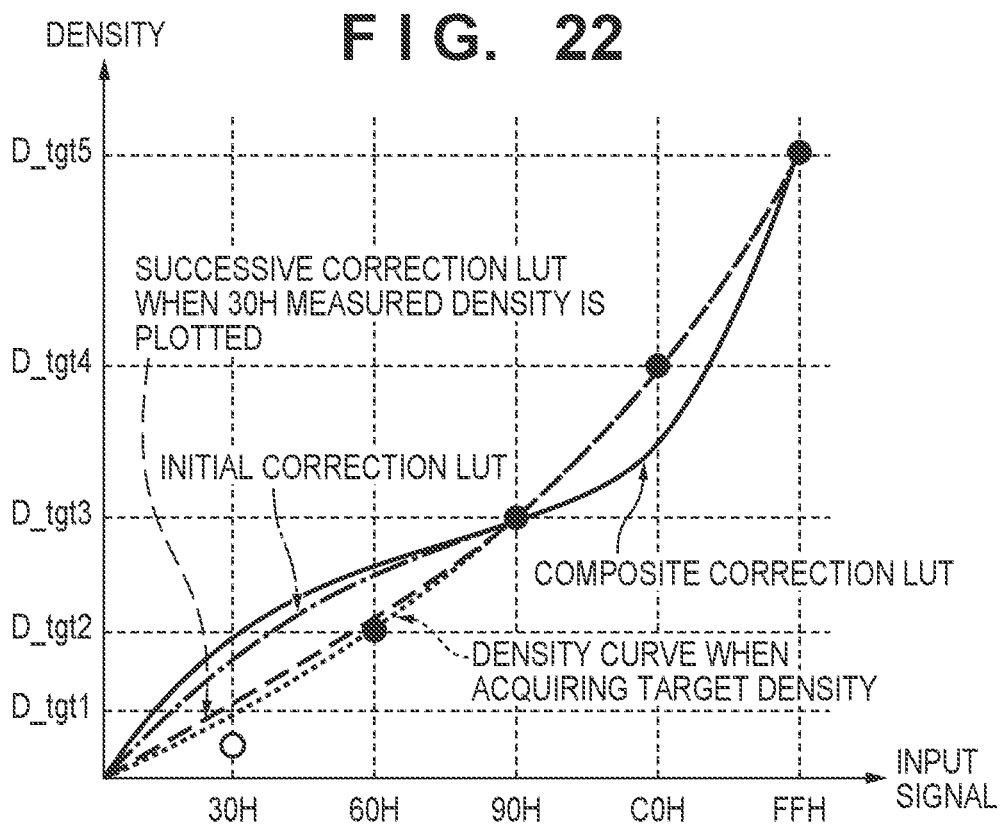
FIG. 22 is a view illustrating a relationship of each LUT at a time of actual measurement control in the embodiment.

Finally, the printer controller CPU 313 generates a composite correction LUT as shown by the solid line in FIG. 22 by combining the successive correction LUT and the initial correction LUT (step S906), applies the composite correction LUT to an output image, and outputs the image. The outputted composite correction LUT is transferred to, for example, the gradation correction unit 316 and used for gradation correction. After the composite correction LUT is reflected, the output image and the gradation pattern for image density correction in the next sheet interval portion are outputted as an image corrected by the composite correction LUT. Thereafter, for example, after printing of a predetermined number of pages, pattern images of different gradations are subsequently generated, density detection is performed, and a composite correction LUT is successively generated by the same procedure. The pattern images of different gradations may be patches of each gradation for 60H, 90H, C0H, FFH in the above example. As for densities other than the density of the actually measured pattern, the base density may be used in the same manner as in the above example.

Normal Density Calculation

Figure 14:
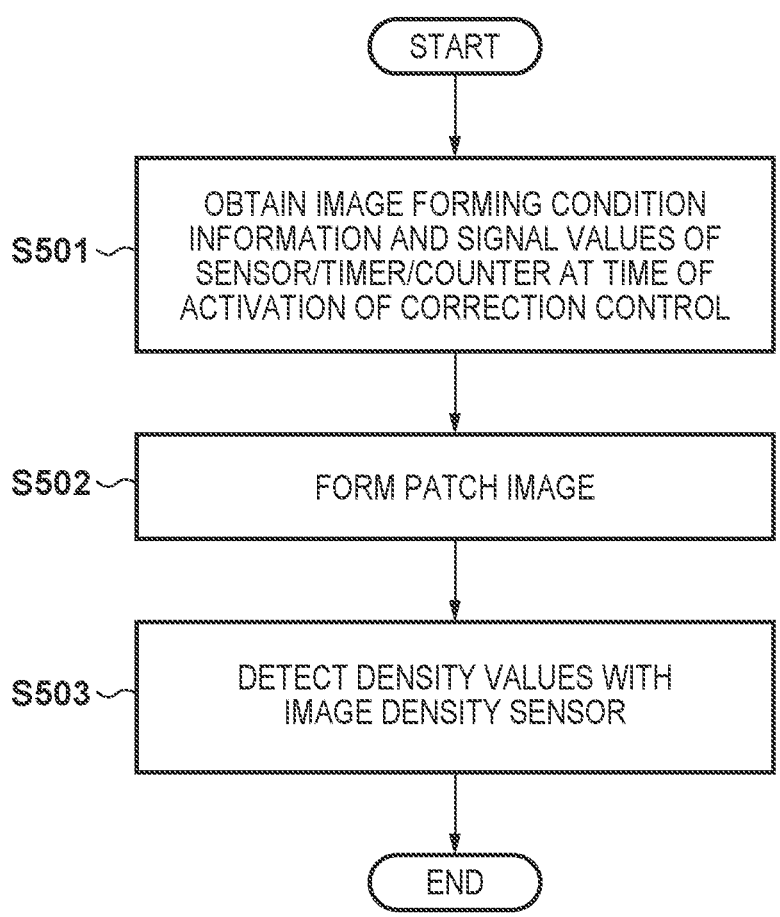
FIG. 14 is a view illustrating a flow for performing formation of a patch image and density calculation in the embodiment.

Next, FIG. 14 shows a flow (step S903) of acquiring density values in the present image forming apparatus in normal (actual measurement-based) density correction control for forming a patch image for density correction. FIG. 14 corresponds to step S901 to step S903 of FIG. 20.

When the activation condition is satisfied, the printer controller CPU 313 acquires, as an input signal values, information such as environmental values, a standing time, and a number of times of toner replenishment at the time of the control operation, and information of an image forming condition for performing image forming from the sensor, timer, and counter provided in the image forming apparatus (step S501). The activation condition is, for example, a density correction control activation condition such as a power source being turned on, reaching a preset number of sheets, or the like. The present invention is not limited to a configuration of acquiring information using a timer and a counter, and the printer controller CPU 313 may be configured to acquire time information and count information.

Next, the printer controller CPU 313 forms a plurality of toner image patterns under an image forming condition corresponding to the acquired information (step S502).

In the present embodiment, 30H, 60H, 90H, C0H, and FFH patterns are sequentially formed, but the present invention is not limited thereto.

Next, the printer controller CPU 313 detects (step S503) density of the patch image formed on the intermediate transfer member using the image density sensor 200, and acquires density values (γ characteristics) at the time of correction.

Density Prediction Model Creation

The image density prediction model is obtained by using, as input information, information correlated with image density variation (variation correlation information) and using image density information as output information, and expressing the results of the experimentation as a mathematical formula. For this reason, the mathematical formula itself may be referred to as a prediction model, a prediction condition, or a determination condition. The input information includes environmental information that can be obtained from the sensor 200 immediately after the power source of the image forming apparatus is turned on or immediately after a restoration. The input information further includes time information, such as a standing time from a previous print which can be obtained from the timer 201, count information, such as the number of toner replenishments or the number of rotations of the developing sleeve which can be obtained from the counter 202, and the previous image forming conditions 203 before the image forming apparatus was let stand. The density prediction model in the embodiment is a multiple regression model, and in the creation thereof, partial regression coefficients corresponding to respective predetermined input information that is an explanatory variable are determined.

Hereinafter, a procedure for creating an image density prediction model used in the present embodiment in advance is described with reference to a flowchart of FIG. 16. The procedure of this flowchart may be executed by the prediction model correction unit 350 in software (or firmware). In hardware, this procedure is performed, for example, by a printer controller CPU 313. In the present description, a multiple regression model is used as an example, but the present invention is not limited to this multiple regression model and may be a regression model according to another scheme. In addition, it is possible to use only some of the example variables as input values (explanatory variables) and it is possible to include other variables. The creation of the prediction model may be performed individually for each device, or may be performed for a sample device. In the latter case, a prediction model may be prepared for the sample device and applied to the same model of image forming apparatus as the initial prediction model. Further, a plurality of sample devices may be used. The prediction model created here is an initial prediction model that is newly produced and installed on an image forming apparatus in which parts etc. have not been consumed, and the model is updated as described later.

First, a large number of environmental condition variation patterns and image forming conditions variation patterns are prepared, predetermined test images are printed under these conditions, and environmental conditions and image density are measured (step S101). The test image may be an image or the like in which a pattern of predetermined densities are lined up in a predetermined arrangement. Environmental conditions include developer toner density at the time of printing, temperature and humidity at various locations, developer toner density at the time of the previous print, standing time since the previous print, and the like. These are environmental information that can be obtained immediately after the power source is turned on. The image forming condition includes a charging potential (hereinafter referred to as Vd) on the photosensitive drums, exposure intensities (hereinafter referred to as LPW), development contrast (hereinafter referred to as Vcont) in the developing portions, and the like. The environmental conditions and image forming conditions to be measured are selected as explanatory variables. Further, the image density means a density of a test image, and is, for example, a density on a photosensitive member of a toner patch, a density on an intermediate transfer member, or a density on a printing medium. In the present example, a case in which, a density on an intermediate transfer member is used for creating the initial prediction model will be described, but other densities may be used. Also, a plurality of density measurement values may be used together such as in a combination of density on an intermediate transfer member and density on a printing medium.

Next, the measured data is classified into identification data and verification data (step S102). The identification data is used for the determination of temporary coefficients, and the verification data is used for the verification of predicted density values using the temporary coefficients and the determination of actual coefficients. The actual coefficients are partial regression coefficients of the generated prediction model. Therefore, it is desirable that the identification data and the verification data be randomly selected from the measured values. Also, the identification data and the verification data may be measured using different devices.

Next, using first measurement data as reference values, variation from the reference values is calculated for the values of each of the measurement items for environmental variation, image forming condition variation, and image density variation (step S103).

Next, the respective measured values of the environmental conditions and image forming conditions classified as identification data are used as input data (explanatory variables), and the coefficients of the multiple regression model are obtained using measured densities that are measured under the respective environmental conditions and image forming conditions as supervisory data (step S104). Coefficients that minimize the error between predicted density values and measured density values are obtained when a predicted density value objective variable is obtained by using each environmental condition and each image forming condition included in the identification data as an explanatory variable. In other words, in step S104, regression model curve fitting is performed. Detailed description thereof will be made after the description of FIG. 16.

Next, predicted density values are calculated using respective measured values of the environmental conditions and image forming conditions designated and classified as verification data as input data. Temporary coefficients are used for the prediction model at this time. Then, the difference between the predicted density values and the measured density values measured under the respective measured values of the environmental conditions and image forming conditions designated and classified as verification data, that is, the prediction error is calculated (step S105).

Finally, the actual coefficients are determined by correcting the temporary coefficients to minimize prediction error or an average value thereof (step S106). That is, as a regression model, a linear function model is determined in which coefficients are multiplied and added for each measurement item of environmental conditions and image forming conditions.

As described above, a multiple regression model is created. Although the measured data is divided into identification data and verification data in the above examples, configuration may be such that it is all identification data, and the temporary coefficients determined in step S104 are used as the final prediction model coefficients. In that case, step S105 and step S106 need not be performed.

Determination of Coefficients

For example, in the following description, as input signal values, the charging potential Vd at the time of printing, the exposure intensity LPW, the developer toner density, and the environmental temperature are described as variation correlation information which is correlated with variation in the density of the image, but the present invention is not limited thereto. Incidentally, items included in the variation correlation information may be included in the base signal values, or may be the same. In addition, regarding the above sensor input values, a four-input first order function model is described, but the invention is not limited thereto, and it is possible to create a regression model by similar processing using five or more sensor inputs and image forming condition inputs.

A linear function model for predicting the image density variation yn_train as an output variable is created from a combination of four kinds of input variables. Here, input variables $x_{i(n)}$ are defined as LPW variation $x_{1(n)}$, a charging potential variation $x_{2(n)}$, a developer toner density variation $x_{3(n)}$, and an environmental temperature variation $x_{4(n)}$ at the time of printing.

Four-Input Model:

$$y_{n\_train} = a_1 \times x_{1(n)} + a_2 \times x_{2(n)} + a_3 \times x_{3(n)} \times a_4 \times x_{4(n)}$$

(i=1, 2, 3, 4 and n=number of data)

More generally, $y_{n\_train} = \Sigma_i a_i \times x_{i(n)}$.

For this input model, measurement data obtained actually measuring image density variation, which is an output variable, is set as supervisory data $y_{n\_teach}$, and curve fitting is performed on this value. As an example of the curve fitting method, for the coefficients ($a_1$, $a_2$, $a_3$, and $a_4$) of the linear function model, the sum of squares L of the prediction error expressed by the following equation of the predicted values and the measured values is calculated, and the coefficients that minimize this are derived.

The derivation method will be described. First, each variable is expressed in a matrix as follows.

$$y_{n\_teach} = \begin{bmatrix} y_{1\_teach} \\ y_{2\_teach} \\ \vdots \\ y_{n\_teach} \end{bmatrix}, \quad \text{[Equation 1]}$$

$$y_{n\_train} = \begin{bmatrix} y_{1\_train} \\ y_{2\_train} \\ \vdots \\ y_{n\_train} \end{bmatrix},$$

$$x = \begin{bmatrix} x_{11} & x_{12} & x_{13} & x_{14} \\ x_{21} & x_{22} & x_{23} & x_{24} \\ \vdots & \vdots & \vdots & \vdots \\ x_{n1} & x_{n2} & x_{n3} & x_{n4} \end{bmatrix},$$

$$a = \begin{bmatrix} a_1 \\ a_2 \\ \vdots \\ a_n \end{bmatrix}$$

As described above, the sum of squares of the differences between the predicted values and the measured values is obtained.

$$\sum_{k=1}^{n} (y_{k\_teach} - y_{k\_train})^2 = \quad \text{[Equation 2]}$$

$$(y_{n\_teach} - y_{n\_train})^T (y_{n\_teach} - y_{n\_train}) =$$

$$y^T y - 2y^T xa + a^T x^T xa$$

This expansion of this is the sum of squares L of the prediction error, and the objective is to obtain the matrix a, that is, the coefficients ($a_1$, $a_2$, $a_3$, $a_4$) of the linear function model that minimize this L.

That is, the coefficient matrix a that minimizes $L = y^T y - 2y^T xa + a^T x^T xa$, where $y = y_{n\_teach}$ and $y_{n\_train} = xa$ is obtained.

Therefore, L is set as the objective variable, and an equation where the derivative of L with respect to a is 0 is set, and by solving that the optimal coefficients of the regression model are derived.

First, a differential equation is obtained.

$$\frac{\partial}{\partial a} L = \frac{\partial}{\partial a} (y^T y - 2y^T Xa + a^T X^T Xa) = \quad \text{[Equation 3]}$$

$$-2y^T X + a^T (X^T X + (X^T X)^T)$$

Then, this solution is set to 0.

$-2y^T X + a^T (X^T X + (X^T X)^T) = 0$

Then, the equation is expanded with a on the left side to obtain a as follows.

$a = ((X^T X)^T X^T y_{n\_teach})$

In this way, by obtaining the coefficient a matrix of the multiple regression model as an example of the image density prediction model, it is possible to create a multiple regression model.

In the present embodiment, the input variables are simple variables such as $x_{1(n)}$, $x_{2(n)}$, $x_{3(n)}$, $x_{4(n)}$, but a complex model can also be considered by preparing a product or quotient of environmental conditions and image forming conditions such as $x_{1(n)} \times x_{2(n)}$. For example, an input variable capable of expressing a change in toner charge amount in consideration of the developer toner density and the standing time can be created, and a prediction model can be studied.

Density Prediction Model Correction

As described above, when calibration control for density adjustment is performed using an optimal density prediction model individually corresponding to the usage environment, output conditions, and usage conditions, it is necessary to correct the current prediction model. This is because it is typically common to, at an initial stage, use an average model that can cover certain usage environments and situations, which is not always optimal for an individual usage environment.

In order to correct the prediction model, data (measured values) obtained by combining actual density variation with environmental conditions, image forming conditions, and the like is required. Therefore, this is usually performed in conjunction with control to perform density adjustment by actually forming patches for calibration, and data for correcting the prediction model is acquired at the same time as execution of the control (actual measurement control) according to patches.

The data number n is increased and addition is made to the following matrix data.

$$y_{n\_teach} = \begin{bmatrix} y_{1\_teach} \\ y_{2\_teach} \\ \vdots \\ y_{n\_teach} \end{bmatrix}, \quad \text{[Equation 4]}$$

$$y_{n\_train} = \begin{bmatrix} y_{1\_train} \\ y_{2\_train} \\ \vdots \\ y_{n\_train} \end{bmatrix},$$

$$x = \begin{bmatrix} x_{11} & x_{12} & x_{13} & x_{14} \\ x_{21} & x_{22} & x_{23} & x_{24} \\ \vdots & \vdots & \vdots & \vdots \\ x_{n1} & x_{n2} & x_{n3} & x_{n4} \end{bmatrix},$$

$$a = \begin{bmatrix} a_1 \\ a_2 \\ \vdots \\ a_n \end{bmatrix}$$

Figure 16:
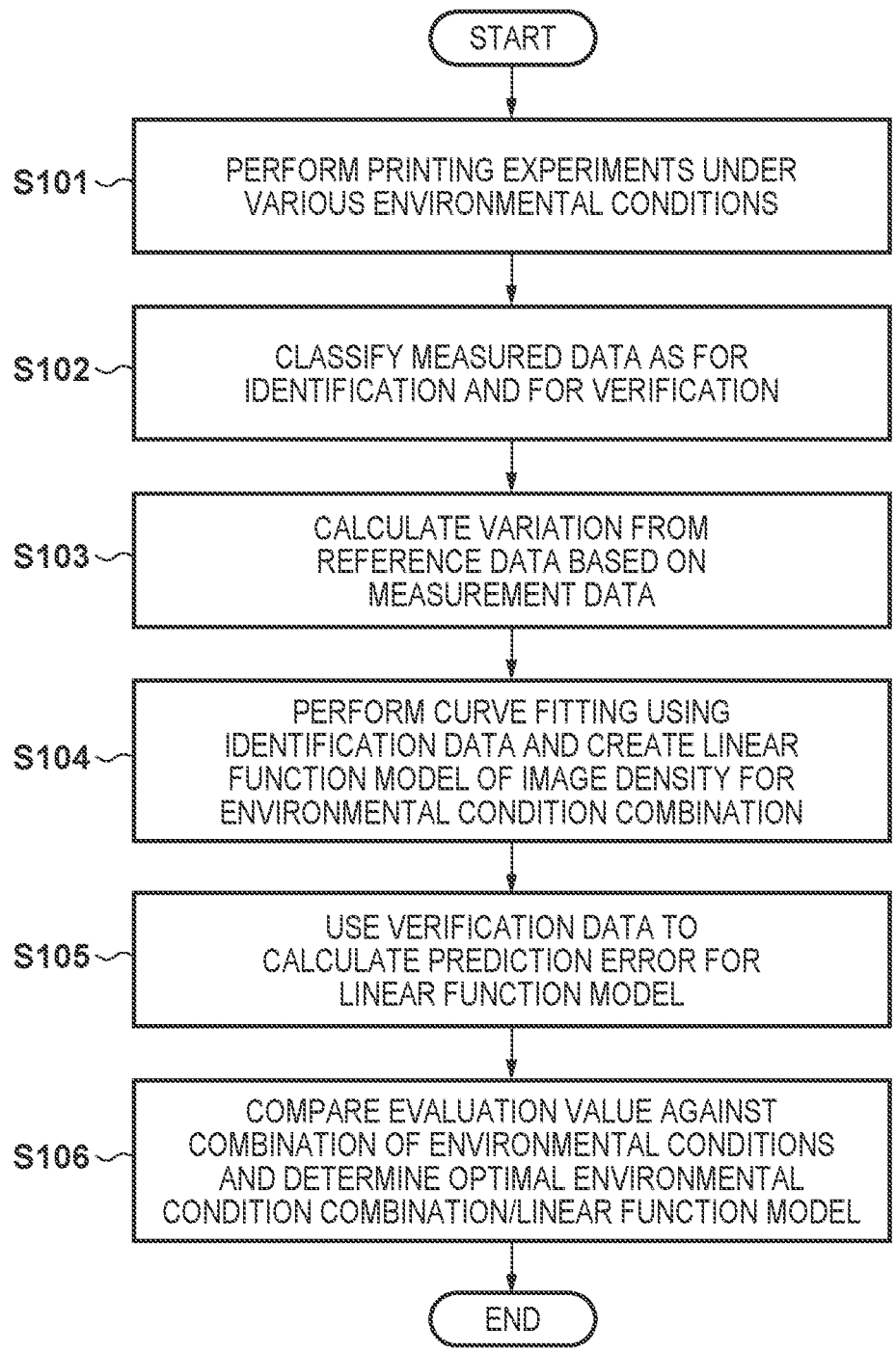
FIG. 16 is a view illustrating a flow for creation of a prediction function model in the embodiment.

Then, using each additionally updated variable, a new multiple regression model adapted to the varying environment can be created by again obtaining the coefficient a of the multiple regression model in a similar manner to the above-described flow (i.e., the method shown in FIG. 16 and Equations 1 to 4).

In addition, it is also conceivable to have a configuration in which, when the density prediction model is corrected, correction of the model in which the density prediction is actually operating is performed as necessary, or in which there are a plurality of density prediction models and the model in which the density prediction is actually performed and a density prediction model that is corrected are separately provided.

Further, as described above, the accumulation of data for correcting the density prediction model and the execution of the calculation for actually obtaining the corrected density prediction model can be realized by performing the calculation in the image forming apparatus or by performing the calculation in an apparatus connected to the image forming apparatus via a network. The location of the calculation is not a limitation on the present invention.

Necessity and Effect of Change in Normal Control Frequency

In the image forming apparatus of the present embodiment, a test image for calibration is formed, and values of image densities that are actually formed currently are acquired by a method of detecting the test image and calculating the densities (hereinafter, density measurement). Also, a method of calculating (estimating) density using a density prediction model as described above (hereinafter, density prediction) is used in conjunction therewith. The image forming apparatus of the present embodiment is characterized in that the obtained measured density and predicted density are compared to control (e.g., increase) the frequency of the density measurement according to the difference; the necessity thereof will be described.

As described above, in the calibration method for predicting variations in color tone and density by using a model, since usage environments vary, an average model that can cover certain usage environments and situations is used in the initial stage. Therefore, depending on the usage environment of a user, the difference between the predicted density and the measured density may be large, that is, when the predicted density is used, calibration is not sufficient, and a deviation in color tone or density tends to occur. Therefore, it is desirable to optimize the density prediction model as early as possible to perform calibration appropriately even when predicted density is used. Here, calibration may be referred to as density control.

Meanwhile, in a system in which the measured density and the predicted density are used in conjunction to calculate the density, it is possible to compare the measured density and the predicted density by simultaneously performing the prediction when the density is measured. The predicted density is calculated by inputting information of a sensor, a timer, and the environment or the like at the time of prediction as described above, but the predicted density may be simultaneously calculated by obtaining this information at the time of actually measuring the density.

Figure 17:
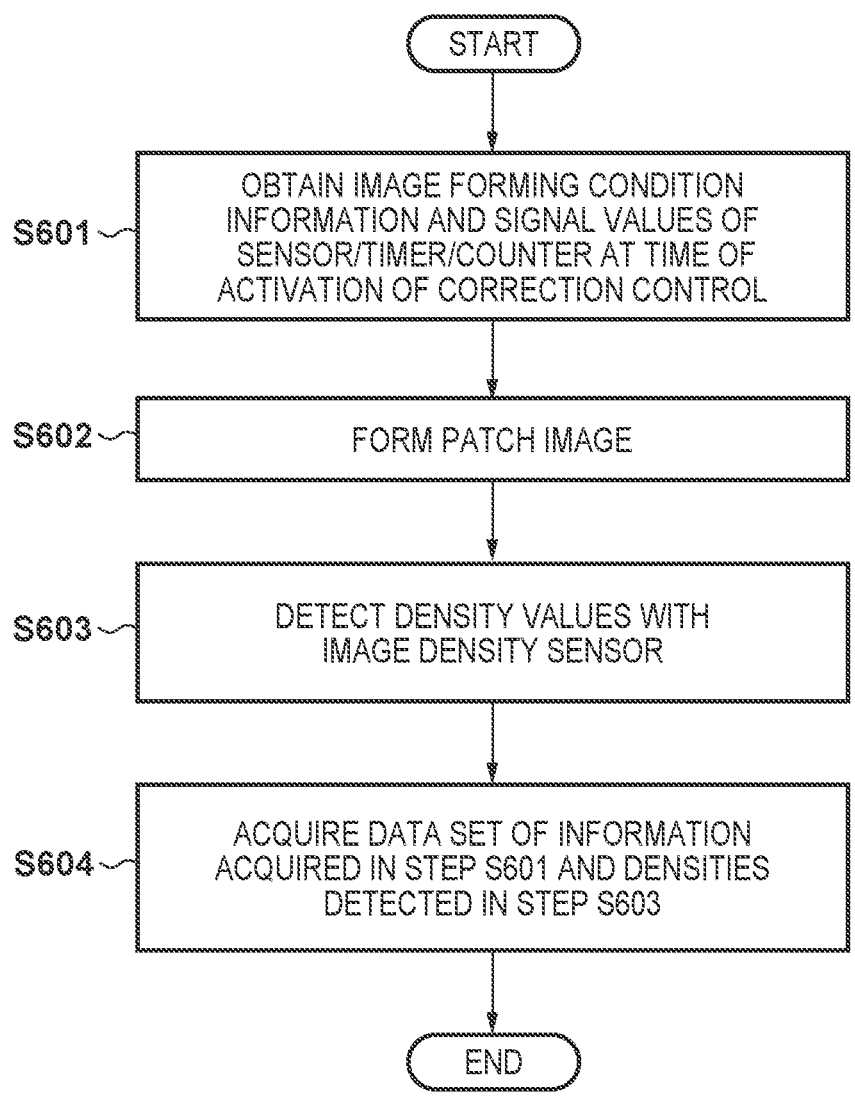
FIG. 17 is a flow for acquiring correction data of a density prediction model in the embodiment.

Similarly, data for correcting the predicted density model as described above can be obtained simultaneously when actually measuring the density, as shown in FIG. 17. Apart from the comparison between the measured density and the predicted density and the difference calculation, the relationship between the measured density and the environment and the output condition at that point in time is acquired as correction data. In FIG. 17, step S601 to step S603 are similar to step S501 to step S503 in FIG. 14, respectively. In FIG. 17, in step S604, the data acquired in step S601 used for prediction control and the density values of the test images (patches) measured in step S603 are stored in association with each other. That is, the procedure of FIG. 14 is described in the above as being used in the actual measurement control, but in the present embodiment, either FIG. 17 is always executed in place of FIG. 14 when FIG. 14 would be executed, or FIG. 17 is executed instead of FIG. 14 when performing calibration of the prediction control.

Here, a case where the frequency of the measured density is increased when the density prediction model is corrected will be described. As described above, in order to correct the prediction model, patch images are actually formed, and a set of relationships between the environment, the condition, and the density is necessary. Therefore, in order to correct the model quickly, it is necessary to acquire a large amount of data quickly.

For example, consider a case where the density control is performed once every 100 print job sheets. Note that this is just an example, and the invention is not limited to this.

In the density control, the ratio of the execution frequency of the actual measurement control and the prediction control is 1:4. For example, the actual measurement control may be performed once every 500 sheets, and in the meantime, the density control may be performed by prediction.

In the case of a user who performs printing of 300 sheets per day, the timing of the density control is, for example, about four times per day: at the time of turning on the power source, after printing the 100th sheet, after printing the 200th sheet, and after printing the 300th sheet. In addition, if the model is corrected based on a small number of data, the model will be of low accuracy due to variation and low reliability of the data, and therefore a certain amount of data is necessary. Here, suppose that the model is corrected after the acquisition of 20 data items.

Considering such a case, the number of times of density control itself is required is 5(once actual measurement every five times)×20 (required number of data items)=100(number of times density control is performed)

Assuming that density control is performed four times a day, the required number of days would be 100÷4=25 days, and it will take 25 days to correct the model according to the usage environment.

For example, considering the case where the frequency of actual measurement control is 1:2 (actual measurement control once every 300 sheets), 3×20=60(number of times density control is performed)

60÷4=15 days

The time to model correction is 15 days, which is a reduction of 10 days.

Thus, it is possible to acquire a corrected model earlier than normal by increasing the measured density control (acquire model correction data) frequency as necessary.

Flow of Change of Normal Control Frequency

Figure 18:
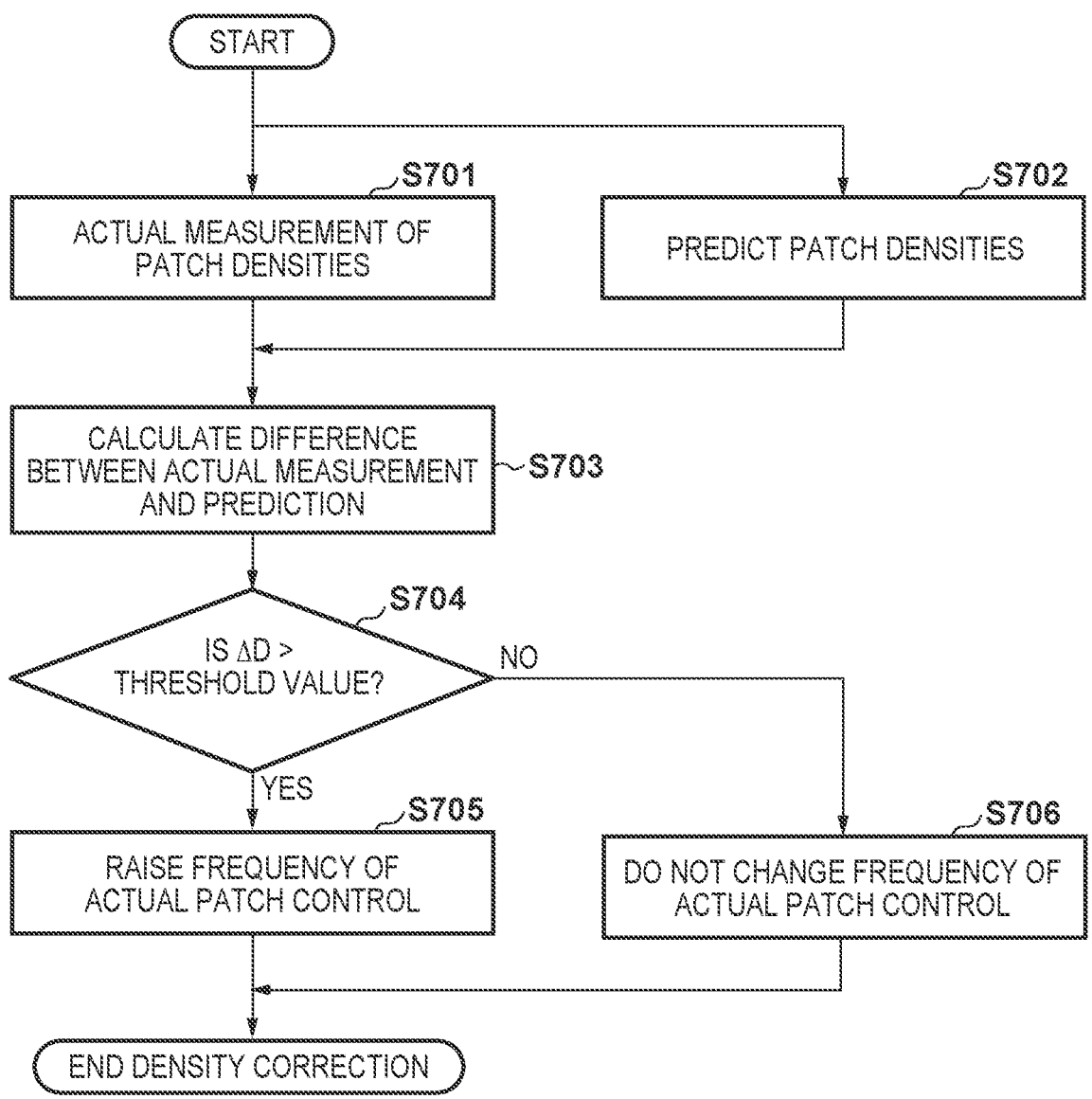
FIG. 18 is a flow for changing the frequency of actual measurement control in the embodiment.

Next, a flow for determining whether to change the frequency of the measured density control will be described with reference to FIG. 18. The process of FIG. 18 is performed, for example, by a printer controller CPU 313. In addition, the flow corresponds to the prediction model correction unit 350 in the software. The processing of FIG. 18 may be performed at any time, and preferably it is desirable to perform the processing at the time of density correction by actual measurement control. The flow may be performed after the density correction control or may be performed prior to the density correction control.

First, the printer controller CPU 313 detects measured densities of patches (step S701). As described with reference to FIG. 14, a patch image for calibration is formed, and the formed patch image is detected by the image density sensor 200. The densities of the test image measured in step S701 may be used for density correction.

The printer controller CPU 313 simultaneously calculates predicted densities at that point in time (step S702). As described in FIG. 15, information such as environmental information of the main body of the printer, image forming conditions, and the like is obtained, a density change amount is calculated, and by adding the density change amount to the base density, a predicted density is calculated.

Next, the printer controller CPU 313 compares measured density and predicted density to calculate a difference (step S703). Note that, the example of comparing densities for each gradation and calculating a density that deviates the most as ΔD is given here. The method of comparing (calculation method) measured density and predicted density is not limited thereto and a method of comparing at a specific gradation or a method of calculating an integration of differences are other options.

The printer controller CPU 313 determines whether the maximum density deviation ΔD is greater than a threshold value (step S704). Here, the threshold value is set to 0.1 for the density difference, for example. When the density deviation ΔD is larger than the threshold value, the printer controller CPU 313 increases the frequency of the actual measurement control (step S705).

This is because the deviation between the predicted density and the measured density is large, and it can be determined that the currently implemented density prediction model is not optimal for the usage environment of the user. Note that this threshold value is just an example, and the invention is not limited to this.

On the other hand, when the predicted and measured density difference values are 0.1 or less, the printer controller CPU 313 does not change the control frequency of the actual measurement control (step S706). This is because the deviation between the predicted density and the measured density is small, and it can be determined that the currently implemented density prediction model is suitable for the usage environment of the user.

Note that the frequency (first frequency) of the actual measurement control (density correction control using actual measurement values) may indicate the frequency (second frequency) of the prediction control (density correction control using prediction values) as a reference, for example, and may be stored in a rewritable memory. In step S705, the stored frequency of the actual measurement control is updated. For example, when the frequency of the prediction control is determined with respect to the actual measurement control, the frequency of the prediction control may be indicated by the number of times of the prediction control. In the example described above, the frequency of the prediction control is initially five times for every one measurement control. To increase the frequency of the measurement control, the period or the number of times the prediction control is performed for one measurement control may be decreased by a predetermined number (e.g., 1). At the maximum frequency, density control is performed entirely by actual measurement control, and in that case the prediction control is also performed once for each actual measurement control. Since the prediction control loses meaning in that case, the maximum frequency of the prediction control may be set to two times for every one measurement control, and the frequency may be controlled so as not to be increased therebeyond.

This frequency may initially be a predetermined value (e.g., 5) and is stored in a predetermined storage area. The value is then replicated in a counter, and the counter value is decremented by one each time prediction control is performed. When the counter value reaches 0, the measurement control is executed, and the procedure of FIG. 18 is also executed to update the frequency. The frequency is then replicated to the aforementioned counter and the process is repeated. Of course, this is only one example.

Further, the frequency of the actual measurement control may be determined on the basis of the frequency of the prediction control. In the above example, the actual measurement control is ⅕ times in relation to one prediction control, and to increase the frequency of the actual measurement control, this value may be increased to ¼ or ⅓. In either case, the interval (period) of the prediction control is fixed, and the interval of the actual measurement control with respect to the interval (period) may be shortened if the difference between density values is smaller than the threshold value.

As described above, the image forming apparatus according to the present embodiment has a method of calculating a color tone/density value by measuring formed patches and a method of calculating a color tone/density value using a prediction model in calibration for color tone/density gradation characteristic stabilization control. In such an image forming apparatus, by comparing measured density and predicted density and changing density control frequency for measured density in accordance with the comparison result, it is possible to achieve optimal prediction model correction in the usage environment in a short period of time.

Variation

The first embodiment describes that measured density and predicted density are compared, and when the comparison result is larger than the threshold value, the frequency of control using measured density is increased.

Figure 19:
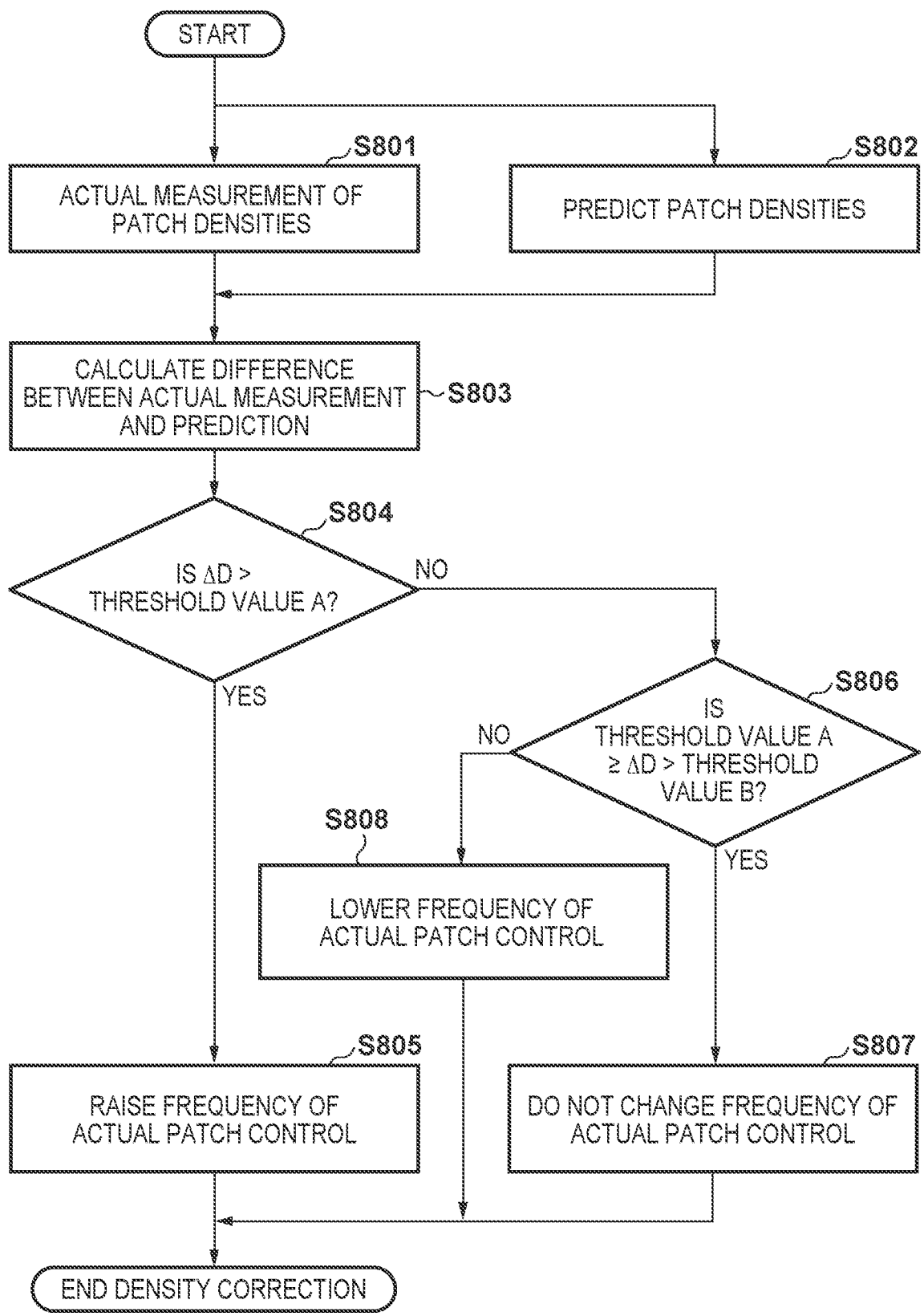
FIG. 19 is a flow for changing the frequency of actual measurement control in the embodiment.

The present variation adds a flow for a case in which the control frequency is reduced, and will be described with reference to FIG. 19. The configuration of the image forming apparatus other than the flow of FIG. 19, the method of creating the model, and the like are similar to those in the first embodiment. In the present variation, the procedure of FIG. 19 may be executed instead of FIG. 18.

First, the printer controller CPU 313 detects measured densities of patches (step S801). The printer controller CPU 313 simultaneously calculates predicted densities at that point in time (step S802).

Next, the printer controller CPU 313 compares measured density and predicted density to calculate a difference (step S803).

Here, the difference value of the density is calculated for each gradation, and the printer controller CPU 313 determines whether or not the maximum difference value is larger than a first threshold value, for example, a density difference of 0.1 (step S804). If the maximum difference value is greater than the first threshold value, the printer controller CPU 313 will raise the frequency of the actual measurement control (step S805).

This is because the deviation between the predicted density and the measured density is large, and it can be determined that the currently implemented density prediction model is not optimal for the usage environment of the user. Note that this threshold value is just an example, and the invention is not limited to this.

Meanwhile, if the maximum value of the difference is equal to or less than the first threshold value, the printer controller CPU 313 determines whether or not the maximum value of the difference is greater than the second threshold value (step S806). The second threshold value is 0.05, for example. If the maximum difference value is equal to or less than the first threshold value and greater than the second threshold value, the printer controller CPU 313 will not change the frequency of the actual measurement control (step S807). This is because the deviation between the predicted density and the measured density is small, and it can be determined that the currently implemented density prediction model is suitable for the usage environment of the user.

If the maximum difference value is equal to or less than the second threshold value, the printer controller CPU 313 will lower the frequency of the measured density control (step S808). This is because the predicted density and the measured density are substantially equal to each other, and it can be determined that the density prediction model is sufficiently suitable for the usage environment of the user. Note that, it is not necessary to strictly apply the equal to or less than the second threshold value and greater than the first threshold value condition, and it may be changed to less than the second threshold or equal to or greater than the first threshold, respectively.

Also, reducing the frequency may mean increasing the period or the number of times the prediction control is performed for the measurement control frequency by a predetermined number (e.g., 1). That is, the timing at which the patch image for the next measured density is formed may be controlled by the printer controller CPU 313.

In this manner, when it is determined that the implemented density prediction model is not suitable for the usage environment of the user, the number of times of actual measurement detection is increased and the number of times of data acquisition for correction of the prediction model is increased. This makes it possible to reduce the downtime, which is an advantage of prediction control, by operating to more quickly create an optimal model and increasing the number of times predicted density control is performed when the model is determined to be suitable for the usage environment of the user.

As described above, the image forming apparatus according to the present variation has a method of calculating a color tone/density value by measuring formed patches and a method of calculating a color tone/density value using a prediction model in calibration for color tone/density gradation characteristic stabilization control. In such an image forming apparatus, measured density and predicted density are compared, and a density control frequency for measured density is changed according to the comparison result. This makes it possible to achieve a correction to an optimal prediction model for the usage environment in a short period of time and to further reduce the downtime of the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-153618, filed Sep. 21, 2021, which is hereby incorporated by reference herein in its entirety.

What is claimed is:

1. An image forming apparatus, comprising:
   an image forming unit configured to form an image on a sheet based on an image forming condition;
   a sensor configured to measure measurement images formed by the image forming unit; and
   a controller configured to:
   control the image forming condition based on a measurement result of measuring a first measurement image by the sensor;
   acquire information having a correlation to density variation of images to be formed by the image forming unit;
   control the image forming condition based on the information;
   determine a first value regarding a density of an image to be formed by the image forming unit, based on a measurement result of measuring a second measurement image by the sensor;
   determine a second value regarding a density of the image to be formed by the image forming unit, based on the information; and
   control a timing at which the image forming unit next forms the first measurement image, based on the first value and the second value.

2. The image forming apparatus according to claim 1, wherein
   the controller controls the timing at which the image forming unit next forms the first measurement image, based on a difference between the first value and the second value.

3. The image forming apparatus according to claim 1, wherein
   the controller, in a case where a difference between the first value and the second value is equal to or less than a threshold value, controls the timing to a first timing, and
   the controller, in a case where the difference between the first value and the second value is greater than the threshold value, controls the timing to a second timing that is earlier than the first timing.

4. The image forming apparatus according to claim 1, wherein
   the controller, in a case where a difference between the first value and the second value is greater than a first threshold value, controls the timing to a first timing, the controller, in a case where the difference between the first value and the second value is equal to or less than the first threshold value and greater than a second threshold value that is less than the first threshold value, controls the timing to a second timing which is later than the first timing, and the controller, in a case where the difference between the first value and the second value is equal to or less than the second threshold value, controls the timing to a third timing that is later than the second timing.

5. The image forming apparatus according to claim 1, wherein the controller, in a case where the difference between the first value and the second value is greater than a threshold value, controls the timing to a timing that is earlier than a current timing, and the controller, in a case where the difference between the first value and the second value is equal to or less than the threshold value, does not change the timing.

6. The image forming apparatus according to claim 1, wherein the controller, in a case where the difference between the first value and the second value is greater than a first threshold value, controls the timing to a timing that is earlier than a current timing, the controller, in a case where the difference between the first value and the second value is equal to or less than a second threshold value that is less than the first threshold value, controls the timing to a timing that is later than the current timing, and the controller, in a case where the difference between the first value and the second value is equal to or less than the first threshold value and greater than the second threshold value, does not change the timing.

7. The image forming apparatus according to claim 1, wherein the controller determines the timing based on a number of sheets on which the image forming unit has formed an image since the previous formation of the first measurement image.

8. The image forming apparatus according to claim 1, wherein the controller, in a case where a difference between the first value and the second value is equal to or less than a threshold value, controls the timing to a first timing, the controller determines the first timing based on whether or not a number of sheets on which the image forming unit has formed an image since the previous formation of the first measurement image has reached a first number of sheets, the controller, in a case where the difference between the first value and the second value is greater than the threshold value, controls the timing to a second timing, and the controller determines the second timing based on whether or not the number of sheets on which the image forming unit has formed an image since the previous formation of the first measurement image has reached a second number of sheets that is less than the first number of sheets.

9. The image forming apparatus according to claim 1, wherein the controller, in a case where a difference between the first value and the second value is greater than a first threshold value, controls the timing to a first timing, the controller determines the first timing based on whether or not a number of sheets on which the image forming unit has formed an image since the previous formation of the first measurement image has reached a first number of sheets, the controller, in a case where the difference between the first value and the second value is equal to or less than the first threshold value and greater than a second threshold value that is less than the first threshold value, controls the timing to a second timing, the controller determines the second timing based on whether or not the number of sheets on which the image forming unit has formed an image since the previous formation of the first measurement image has reached a second number of sheets that is greater than the first number of sheets, the controller, in a case where the difference between the first value and the second value is equal to or less than the second threshold value, controls the timing to a third timing, and the controller determines the third timing based on whether or not the number of sheets on which the image forming unit has formed an image since the previous formation of the first measurement image has reached a third number of sheets that is greater than the second number of sheets.

10. The image forming apparatus according to claim 1, further comprising:

an image carrying member on which the measurement image is formed, wherein the sensor measures the measurement images on the image carrying member.

11. The image forming apparatus according to claim 1, wherein the information includes an elapsed time since the image forming unit formed a previous image.

12. The image forming apparatus according to claim 1, wherein the image forming unit forms an image by using a supplied developing agent, and the information includes a number of times that the developing agent has been supplied.

13. The image forming apparatus according to claim 1, wherein the image forming unit includes a developing sleeve that develops an electrostatic latent image by using a developing agent, and the information includes a number of rotations of the developing sleeve.

14. The image forming apparatus according to claim 1, wherein the second measurement image includes images of different gradations, the controller determines, as the first value, densities of the images of the different gradations, based on the measurement result of the sensor, the controller determines, as the second value, predicted densities of the images of the different gradations, based on the information, the controller, for each of the different gradations, determines a difference between the density of the image of the respective gradation and the predicted density of the image of the respective gradation, and the controller controls the timing based on the largest difference among the differences of the respective gradations.

15. The image forming apparatus according to claim 1, wherein the second measurement image includes images of different gradations, the controller determines, as the first value, densities of the images of the different gradations, based on the measurement result of the sensor, the controller determines, as the second value, predicted densities of the images of the different gradations, based on the information, the controller, for each of the different gradations, determines a difference between the density of the image of the respective gradation and the predicted density of the image of the respective gradation, and the controller controls the timing based on an accumulated value of the differences of the respective gradations.

16. The image forming apparatus according to claim 1, wherein the second measurement image is an image that has a predetermined gradation.

* * * * *